US011768809B2

(12) United States Patent
Jaltade et al.

(10) Patent No.: US 11,768,809 B2
(45) Date of Patent: Sep. 26, 2023

(54) MANAGING INCREMENTAL SNAPSHOTS FOR FAST LEADER NODE BRING-UP

(71) Applicant: Nutanix, Inc., San Jose, CA (US)

(72) Inventors: Aditya Vilas Jaltade, San Jose, CA (US); Arumugam Arumugam, Bellevue, WA (US); Pavan Kumar Konka, Milpitas, CA (US); Karan Gupta, San Jose, CA (US); Rishi Bhardwaj, San Francisco, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/947,444

(22) Filed: Jul. 31, 2020

(65) Prior Publication Data

US 2021/0349858 A1 Nov. 11, 2021

Related U.S. Application Data

(60) Provisional application No. 63/022,315, filed on May 8, 2020.

(51) Int. Cl.
*G06F 16/00* (2019.01)
*G06F 16/182* (2019.01)
(Continued)

(52) U.S. Cl.
CPC .......... *G06F 16/182* (2019.01); *G06F 16/128* (2019.01); *G06F 16/14* (2019.01)

(58) Field of Classification Search
CPC ...... G06F 16/182; G06F 16/128; G06F 16/14; G06F 16/188; G06F 16/184
See application file for complete search history.

(56) References Cited

U.S. PATENT DOCUMENTS 5,253,252 A 10/1993 Tobol
5,276,867 A 1/1994 Kenley et al.
(Continued)

FOREIGN PATENT DOCUMENTS

CN 103746997 4/2014
CN 103746997 A * 4/2014
(Continued)

OTHER PUBLICATIONS

US 11,048,595 B2, 06/2021, Venkatesh et al. (withdrawn)
(Continued)

*Primary Examiner* — Cheryl Lewis
(74) *Attorney, Agent, or Firm* — Vista IP Law Group, LLP

(57) ABSTRACT

Methods, systems and computer program products for computer system data management. A leader node that is in a leader-follower relationship with a follower node is deployed to manage metadata across a plurality of interconnected computing nodes of the computer system. Upon a failure of any sort that results in a loss of operation or a disconnection of the leader node, the followers undertake steps to bring up a new leader. Such steps to bring up a new leader include electing a new leader to replace the lost or disconnected leader and initializing the data state of the new leader node by causing the leader to request incremental snapshots from followers. Additional metadata that might have changed since closing the incremental snapshots can also be retrieved from the followers. The metadata that might have changed since the time of closing the incremental snapshot is subjected to verification using a consensus algorithm.

30 Claims, 17 Drawing Sheets

(51) Int. Cl.
 *G06F 16/14* (2019.01)
 *G06F 16/11* (2019.01)

(56) References Cited

U.S. PATENT DOCUMENTS

| | | |
|---|---|---|
| 5,664,144 A | 9/1997 | Yanai et al. |
| 5,870,555 A | 2/1999 | Pruett et al. |
| 5,873,085 A | 2/1999 | Enoki |
| 5,884,308 A | 3/1999 | Foulston |
| 5,924,096 A | 7/1999 | Draper |
| 6,055,543 A | 4/2000 | Christensen et al. |
| 6,085,234 A | 7/2000 | Pitts et al. |
| 6,101,508 A | 8/2000 | Wolff |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,363,416 B1 | 3/2002 | Naeimi et al. |
| 6,442,602 B1 | 8/2002 | Choudhry |
| 6,539,381 B1 | 3/2003 | Prasad |
| 1,062,581 A1 | 10/2003 | Kleiman |
| 6,684,397 B1 | 1/2004 | Byer et al. |
| 6,738,801 B1 | 5/2004 | Kawaguchi et al. |
| 6,928,589 B1 | 8/2005 | Pomaranski et al. |
| 6,963,914 B1 | 11/2005 | Breitbart et al. |
| 6,968,345 B1 | 11/2005 | Muhlestein |
| 7,120,631 B1 | 10/2006 | Vahalia et al. |
| 7,159,056 B2 | 1/2007 | Goldick |
| 7,162,467 B2 | 1/2007 | Eshleman |
| 7,356,679 B1 | 4/2008 | Le et al. |
| 7,366,738 B2 | 4/2008 | Yorke |
| 7,379,419 B2 | 5/2008 | Collins |
| 7,409,511 B2 | 8/2008 | Edwards et al. |
| 7,421,578 B1 | 9/2008 | Huang et al. |
| 7,461,374 B1 | 12/2008 | Balint et al. |
| 7,606,868 B1 | 10/2009 | Le et al. |
| 7,647,427 B1 | 1/2010 | Devarapalli |
| 7,702,843 B1 | 4/2010 | Chen et al. |
| 7,707,618 B1 | 4/2010 | Cox |
| 7,720,864 B1 | 5/2010 | Muth et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,890,529 B1 | 2/2011 | Srinivasan et al. |
| 7,934,117 B2 | 4/2011 | Kakivaya et al. |
| 7,937,453 B1 | 5/2011 | Hayden et al. |
| 7,937,455 B2 | 5/2011 | Saha et al. |
| 7,941,470 B2 | 5/2011 | Le et al. |
| 7,990,962 B2 | 8/2011 | Chang et al. |
| 8,051,252 B2 | 11/2011 | Williams |
| 8,051,262 B2 | 11/2011 | Ichikawa et al. |
| 8,095,810 B2 | 1/2012 | Matsuzawa et al. |
| 8,095,931 B1 | 1/2012 | Chen et al. |
| 8,190,588 B2 | 5/2012 | Gupta et al. |
| 8,219,769 B1 | 7/2012 | Wilk |
| 8,352,482 B2 | 1/2013 | Hansen |
| 8,352,608 B1 | 1/2013 | Keagy et al. |
| 8,359,594 B1 | 1/2013 | Davidson |
| 8,365,167 B2 | 1/2013 | Beaty et al. |
| 8,392,680 B1 | 3/2013 | Natanzon et al. |
| 8,407,448 B1 | 3/2013 | Hayden et al. |
| 8,424,003 B2 | 4/2013 | Degenaro et al. |
| 8,447,728 B2 | 5/2013 | Prahlad et al. |
| 8,473,462 B1 | 6/2013 | Banerjee |
| 8,473,775 B1 | 6/2013 | Helmick |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron |
| 8,601,471 B2 | 12/2013 | Beaty |
| 8,601,473 B1 | 12/2013 | Aron et al. |
| 8,635,351 B2 | 1/2014 | Astete et al. |
| 8,646,089 B2 | 2/2014 | Jayanthi et al. |
| 8,655,851 B2 | 2/2014 | Patwardhan et al. |
| 8,688,660 B1 | 4/2014 | Sivasubramanian et al. |
| 8,725,679 B2 | 5/2014 | Nair |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,838,923 B2 | 9/2014 | Prahlad et al. |
| 8,850,130 B1 | 9/2014 | Aron et al. |
| 8,863,124 B1 | 10/2014 | Aron |
| 8,898,668 B1 | 11/2014 | Costea |
| 8,914,429 B2 | 12/2014 | Pitts |
| 8,935,563 B1 | 1/2015 | Rajaa et al. |
| 8,949,557 B2 | 2/2015 | Kamei et al. |
| 8,966,188 B1 | 2/2015 | Bardale |
| 8,983,952 B1 | 3/2015 | Zhang et al. |
| 8,996,783 B2 | 3/2015 | Huang et al. |
| 9,009,106 B1 | 4/2015 | Aron et al. |
| 9,032,248 B1 | 5/2015 | Petty |
| 9,043,567 B1 | 5/2015 | Modukuri et al. |
| 9,060,014 B2 | 6/2015 | Crowley |
| 9,069,708 B2 | 6/2015 | Gill et al. |
| 9,152,628 B1 | 10/2015 | Stacey et al. |
| 9,154,535 B1 | 10/2015 | Harris |
| 9,165,003 B1 | 10/2015 | Tummala |
| 9,201,698 B2 | 12/2015 | Ashok et al. |
| 9,201,704 B2 | 12/2015 | Chang et al. |
| 9,201,887 B1 | 12/2015 | Earl et al. |
| 9,213,513 B2 | 12/2015 | Hartz et al. |
| 9,244,674 B2 | 1/2016 | Waterman et al. |
| 9,244,969 B1 | 1/2016 | Love et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,274,817 B1 | 3/2016 | Fan et al. |
| 9,286,298 B1 | 3/2016 | Gillett, Jr. |
| 9,286,344 B1 * | 3/2016 | Bhardwaj ............... G06F 16/27 |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,389,887 B1 | 7/2016 | Aron et al. |
| 9,405,566 B2 | 8/2016 | Chawla et al. |
| 9,411,628 B2 | 8/2016 | Bezbaruah et al. |
| 9,448,887 B1 | 9/2016 | Ben Dayan et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,590,843 B2 * | 3/2017 | Cui .................... H04L 41/0668 |
| 9,619,257 B1 | 4/2017 | Aron et al. |
| 9,634,990 B2 | 4/2017 | Lee |
| 9,639,428 B1 | 5/2017 | Boda |
| 9,639,588 B2 | 5/2017 | Cheng |
| 9,652,265 B1 | 5/2017 | Narayanasamy et al. |
| 9,658,899 B2 | 5/2017 | Jenkins |
| 9,690,670 B1 | 6/2017 | Paulzagade et al. |
| 9,733,958 B2 * | 8/2017 | Cui ......................... G06F 9/50 |
| 9,740,436 B2 | 8/2017 | Fiebrich-Kandler et al. |
| 9,740,472 B1 * | 8/2017 | Sohi ....................... G06F 15/173 |
| 9,740,723 B2 | 8/2017 | Prahlad et al. |
| 9,747,287 B1 | 8/2017 | Bhardwaj et al. |
| 9,772,284 B2 * | 9/2017 | Quan ...................... G01N 21/77 |
| 9,772,866 B1 | 9/2017 | Aron et al. |
| 9,779,015 B1 * | 10/2017 | Oikarinen ............... G06F 3/067 |
| 9,817,703 B1 | 11/2017 | Ryland et al. |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,893,988 B2 | 2/2018 | Agarwal et al. |
| 9,898,522 B2 | 2/2018 | Cole et al. |
| 9,940,154 B2 | 4/2018 | Ramani et al. |
| 9,946,573 B2 | 4/2018 | Mcdermott |
| 10,009,215 B1 | 6/2018 | Shorey |
| 10,050,862 B2 | 8/2018 | Nambiar et al. |
| 10,083,022 B2 | 9/2018 | Fukui et al. |
| 10,084,873 B2 | 9/2018 | Dornemann |

(56) References Cited

U.S. PATENT DOCUMENTS

| | | |
|---|---|---|
| 10,095,506 B2 | 10/2018 | Gopalapura Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,210,172 B1 | 2/2019 | Konig et al. |
| 10,248,657 B2 | 4/2019 | Prahlad et al. |
| 10,311,153 B2 | 6/2019 | Mason |
| 10,362,092 B1 * | 7/2019 | Parthasarathy ....... G06F 3/0607 |
| 10,367,753 B2 | 7/2019 | Schultze et al. |
| 10,379,759 B2 * | 8/2019 | Bhardwaj ............ G06F 16/188 |
| 10,394,547 B2 | 8/2019 | Fukui et al. |
| 10,419,426 B2 | 9/2019 | Bakshan et al. |
| 10,523,592 B2 | 12/2019 | Byers et al. |
| 10,530,742 B2 | 1/2020 | Shah et al. |
| 10,534,634 B2 | 1/2020 | Yang et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,542,049 B2 * | 1/2020 | Cui ....................... H04L 63/029 |
| 10,594,730 B1 | 3/2020 | Summers |
| 10,599,459 B2 | 3/2020 | Livshits |
| 10,642,507 B2 * | 5/2020 | Gupta .................... G06F 3/061 |
| 10,642,518 B1 | 5/2020 | Bezbaruah et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,728,255 B2 | 7/2020 | Jindal et al. |
| 10,809,998 B2 | 10/2020 | Gopalapura Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,949,192 B2 | 3/2021 | Gopalapura Venkatesh |
| 10,963,182 B2 | 3/2021 | Blau et al. |
| 11,025,626 B1 | 6/2021 | Todd |
| 11,086,826 B2 | 8/2021 | Thummala |
| 11,106,447 B2 | 8/2021 | Gupta |
| 11,194,680 B2 * | 12/2021 | Konka .................... H04L 43/20 |
| 11,218,418 B2 * | 1/2022 | Gupta .................... H04L 69/40 |
| 11,281,484 B2 | 3/2022 | Bafna et al. |
| 11,288,239 B2 | 3/2022 | Bafna et al. |
| 11,294,777 B2 | 4/2022 | Venkatesh et al. |
| 11,310,286 B2 * | 4/2022 | Cui ....................... H04L 63/205 |
| 2001/0047400 A1 | 11/2001 | Coates |
| 2002/0069196 A1 | 6/2002 | Betros |
| 2002/0120763 A1 | 8/2002 | Miloushev et al. |
| 2002/0133491 A1 | 9/2002 | Sim et al. |
| 2003/0014442 A1 | 1/2003 | Shiigi |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0199734 A1 | 10/2004 | Rajamani |
| 2004/0210591 A1 | 10/2004 | Hirschfeld et al. |
| 2004/0225742 A1 | 11/2004 | Loaiza |
| 2004/0267832 A1 | 12/2004 | Wong et al. |
| 2005/0094574 A1 | 5/2005 | Han et al. |
| 2005/0120160 A1 | 6/2005 | Plouffe et al. |
| 2005/0120180 A1 | 6/2005 | Schornbach et al. |
| 2005/0125503 A1 | 6/2005 | Iyengar et al. |
| 2005/0193221 A1 | 9/2005 | Yoneyama |
| 2005/0193245 A1 | 9/2005 | Hayden et al. |
| 2005/0201272 A1 | 9/2005 | Wang et al. |
| 2005/0210461 A1 | 9/2005 | Srivastava et al. |
| 2005/0226059 A1 | 10/2005 | Kavuri et al. |
| 2005/0228798 A1 | 10/2005 | Shepard et al. |
| 2005/0268298 A1 | 12/2005 | Hunt et al. |
| 2006/0010227 A1 | 1/2006 | Atluri |
| 2006/0047685 A1 | 3/2006 | Dearing et al. |
| 2006/0069912 A1 | 3/2006 | Zheng et al. |
| 2006/0080445 A1 | 4/2006 | Chang |
| 2006/0080657 A1 | 4/2006 | Goodman |
| 2006/0136781 A1 | 6/2006 | Lamport |
| 2006/0167921 A1 | 7/2006 | Grebus |
| 2006/0206901 A1 | 9/2006 | Chan |
| 2006/0224918 A1 | 10/2006 | Koike |
| 2006/0225065 A1 | 10/2006 | Chandhok et al. |
| 2006/0271510 A1 | 11/2006 | Harward |
| 2006/0271931 A1 | 11/2006 | Harris |
| 2007/0022129 A1 | 1/2007 | Bahar et al. |
| 2007/0038913 A1 | 2/2007 | Allen et al. |
| 2007/0100905 A1 | 5/2007 | Masters et al. |
| 2007/0171921 A1 | 7/2007 | Wookey et al. |
| 2007/0179995 A1 | 8/2007 | Prahlad |
| 2007/0271561 A1 | 11/2007 | Winner et al. |
| 2007/0300220 A1 | 12/2007 | Seliger et al. |
| 2008/0040483 A1 | 2/2008 | Nakatani |
| 2008/0071997 A1 | 3/2008 | Loaiza |
| 2008/0098194 A1 | 4/2008 | Hashimoto et al. |
| 2008/0104349 A1 | 5/2008 | Maruyama |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0201414 A1 | 8/2008 | Amir et al. |
| 2008/0201457 A1 | 8/2008 | London |
| 2008/0208938 A1 | 8/2008 | Lin et al. |
| 2008/0263113 A1 | 10/2008 | Krishnaiyer |
| 2008/0270677 A1 | 10/2008 | Kolakowski |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0113034 A1 | 4/2009 | Krishnappa et al. |
| 2009/0144720 A1 | 6/2009 | Roush et al. |
| 2009/0150885 A1 | 6/2009 | Safari |
| 2009/0158082 A1 | 6/2009 | Jain et al. |
| 2009/0171971 A1 | 7/2009 | Goddard et al. |
| 2009/0193272 A1 | 7/2009 | Matsuzawa et al. |
| 2009/0216975 A1 | 8/2009 | Halperin et al. |
| 2009/0248870 A1 | 10/2009 | Kamei et al. |
| 2009/0249470 A1 | 10/2009 | Litvin et al. |
| 2009/0254572 A1 | 10/2009 | Redlich |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2009/0290572 A1 | 11/2009 | Gonia et al. |
| 2010/0023521 A1 | 1/2010 | Arcese |
| 2010/0042869 A1 | 2/2010 | Szabo et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0110150 A1 | 5/2010 | Xu et al. |
| 2010/0138921 A1 | 6/2010 | Na et al. |
| 2010/0162226 A1 | 6/2010 | Borissov et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0262717 A1 | 10/2010 | Critchley |
| 2010/0275205 A1 | 10/2010 | Nakajima |
| 2010/0306256 A1 | 12/2010 | Blackman |
| 2011/0022694 A1 | 1/2011 | Dalal et al. |
| 2011/0022695 A1 | 1/2011 | Dalal et al. |
| 2011/0022812 A1 | 1/2011 | Van et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0107135 A1 | 5/2011 | Andrews et al. |
| 2011/0119668 A1 | 5/2011 | Calder |
| 2011/0119763 A1 | 5/2011 | Wade et al. |
| 2011/0125835 A1 | 5/2011 | Soltis |
| 2011/0137879 A1 | 6/2011 | Dubey |
| 2011/0145627 A1 | 6/2011 | Huras et al. |
| 2011/0161299 A1 | 6/2011 | Prahlad et al. |
| 2011/0173493 A1 | 7/2011 | Armstrong et al. |
| 2011/0179414 A1 | 7/2011 | Goggin et al. |
| 2011/0184993 A1 | 7/2011 | Chawla |
| 2011/0185292 A1 | 7/2011 | Chawla et al. |
| 2011/0225574 A1 | 9/2011 | Khalidi et al. |

(56) References Cited

U.S. PATENT DOCUMENTS

| | | |
|---|---|---|
| 2011/0239213 A1 | 9/2011 | Aswani et al. |
| 2011/0251992 A1 | 10/2011 | Bethlehem |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0078948 A1 | 3/2012 | Darcy |
| 2012/0081395 A1 | 4/2012 | Adi et al. |
| 2012/0084381 A1 | 4/2012 | Alladi et al. |
| 2012/0117555 A1 | 5/2012 | Banerjee et al. |
| 2012/0126177 A1 | 5/2012 | Meissner et al. |
| 2012/0166866 A1 | 6/2012 | Rao et al. |
| 2012/0209983 A1 | 8/2012 | Bronner |
| 2012/0222089 A1 | 8/2012 | Whelan et al. |
| 2012/0233463 A1 | 9/2012 | Holt et al. |
| 2012/0233608 A1 | 9/2012 | Toeroe |
| 2012/0243795 A1 | 9/2012 | Head et al. |
| 2012/0254342 A1 | 10/2012 | Evans |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0266231 A1 | 10/2012 | Spiers et al. |
| 2012/0272237 A1 | 10/2012 | Baron |
| 2012/0290630 A1 | 11/2012 | Aizman et al. |
| 2012/0304247 A1 | 11/2012 | Badger |
| 2012/0310881 A1 | 12/2012 | Shadmon |
| 2012/0310892 A1 | 12/2012 | Dam et al. |
| 2012/0317142 A1 | 12/2012 | Broecheler et al. |
| 2012/0324183 A1 | 12/2012 | Chiruvolu et al. |
| 2013/0007741 A1 | 1/2013 | Britsch et al. |
| 2013/0036323 A1 | 2/2013 | Goose et al. |
| 2013/0046740 A1 | 2/2013 | Li et al. |
| 2013/0047160 A1 | 2/2013 | Conover |
| 2013/0054973 A1 | 2/2013 | Fok et al. |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0138995 A1 | 5/2013 | Sivaramakrishnan et al. |
| 2013/0151888 A1 | 6/2013 | Bhattiprolu et al. |
| 2013/0152077 A1 | 6/2013 | Leitman et al. |
| 2013/0152085 A1 | 6/2013 | Amore et al. |
| 2013/0174246 A1 | 7/2013 | Schrecker et al. |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0219030 A1 | 8/2013 | Szabo |
| 2013/0227379 A1 | 8/2013 | Gupta et al. |
| 2013/0227550 A1 | 8/2013 | Weinstein et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0235774 A1 | 9/2013 | Jo et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2013/0304694 A1 | 11/2013 | Cronic et al. |
| 2013/0332771 A1 | 12/2013 | Salapura et al. |
| 2014/0006708 A1 | 1/2014 | Huynh et al. |
| 2014/0025796 A1 | 1/2014 | Vibhor et al. |
| 2014/0052877 A1 | 2/2014 | Mao |
| 2014/0059392 A1 | 2/2014 | Ren et al. |
| 2014/0068612 A1 | 3/2014 | Torrey |
| 2014/0068711 A1 | 3/2014 | Schweitzer, III et al. |
| 2014/0075029 A1 | 3/2014 | Lipchuk et al. |
| 2014/0089259 A1 | 3/2014 | Cheng |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0101649 A1 | 4/2014 | Kamble |
| 2014/0108587 A1 | 4/2014 | Goldberg |
| 2014/0109172 A1 | 4/2014 | Barton et al. |
| 2014/0115182 A1 | 4/2014 | Sabaa et al. |
| 2014/0123138 A1 | 5/2014 | Lee et al. |
| 2014/0143831 A1 | 5/2014 | Fieweger |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0164831 A1 | 6/2014 | Merriman et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189429 A1 | 7/2014 | Gill |
| 2014/0189677 A1 | 7/2014 | Curzi |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0222953 A1 | 8/2014 | Karve et al. |
| 2014/0230024 A1 | 8/2014 | Uehara et al. |
| 2014/0237464 A1 | 8/2014 | Waterman et al. |
| 2014/0245387 A1 | 8/2014 | Colpo et al. |
| 2014/0250300 A1 | 9/2014 | Runkis et al. |
| 2014/0279909 A1 | 9/2014 | Sudarsanam et al. |
| 2014/0298185 A1 | 10/2014 | Chen |
| 2014/0310710 A1 | 10/2014 | Lubsey et al. |
| 2014/0359612 A1 | 12/2014 | D'Amato et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032653 A1 | 1/2015 | Iyer et al. |
| 2015/0032690 A1 | 1/2015 | Hoque et al. |
| 2015/0039735 A1 | 2/2015 | Zeyliger |
| 2015/0039763 A1 | 2/2015 | Chaudhary et al. |
| 2015/0039837 A1 | 2/2015 | Quan et al. |
| 2015/0058298 A1 | 2/2015 | Earl et al. |
| 2015/0081644 A1 | 3/2015 | Pitts |
| 2015/0095788 A1 | 4/2015 | Thiele et al. |
| 2015/0106325 A1 | 4/2015 | Cole et al. |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0143164 A1 | 5/2015 | Veerla |
| 2015/0172412 A1 | 6/2015 | Escriva |
| 2015/0178019 A1 | 6/2015 | Hegdal et al. |
| 2015/0205618 A1 | 7/2015 | Bailey et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0244802 A1 | 8/2015 | Simoncelli |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0347775 A1 | 12/2015 | Bie et al. |
| 2015/0355862 A1 | 12/2015 | Hayes |
| 2015/0378761 A1 | 12/2015 | Sevigny |
| 2015/0378853 A1 | 12/2015 | Sevigny |
| 2016/0011898 A1 | 1/2016 | Lee |
| 2016/0034555 A1 | 2/2016 | Rahut et al. |
| 2016/0050118 A1 | 2/2016 | Blanco et al. |
| 2016/0057009 A1 | 2/2016 | Kadayam et al. |
| 2016/0070492 A1 | 3/2016 | Cherubini et al. |
| 2016/0077936 A1 | 3/2016 | Tang et al. |
| 2016/0077988 A1 | 3/2016 | Tipton |

(56) References Cited

U.S. PATENT DOCUMENTS

| | | |
|---|---|---|
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179416 A1 | 6/2016 | Mutha |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0204977 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy |
| 2016/0301766 A1 | 10/2016 | Ionescu et al. |
| 2016/0316003 A1 | 10/2016 | Snider |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0359955 A1 | 12/2016 | Gill et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0094002 A1 | 3/2017 | Kumar et al. |
| 2017/0109184 A1 | 4/2017 | Ramani et al. |
| 2017/0160983 A1 | 6/2017 | Fiske et al. |
| 2017/0177638 A1 | 6/2017 | Bhosale et al. |
| 2017/0193021 A1 | 7/2017 | Deng |
| 2017/0206074 A1 | 7/2017 | Arcese et al. |
| 2017/0206207 A1 | 7/2017 | Bondurant et al. |
| 2017/0214738 A1 | 7/2017 | Agarwal et al. |
| 2017/0220661 A1 | 8/2017 | Cao et al. |
| 2017/0228300 A1 | 8/2017 | Thomas |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0264684 A1 | 9/2017 | Spillane |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0014650 A1 | 1/2018 | Tao |
| 2018/0062993 A1 | 3/2018 | Wu et al. |
| 2018/0129426 A1 | 5/2018 | Aron et al. |
| 2018/0143845 A1 | 5/2018 | Chawla et al. |
| 2018/0145960 A1 | 5/2018 | Bakshan |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0196719 A1 | 7/2018 | Glass |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Gopalapura Venkatesh et al. |
| 2019/0034240 A1 | 1/2019 | Nabi |
| 2019/0079747 A1 | 3/2019 | Sinha et al. |
| 2019/0129808 A1 | 5/2019 | Acharya et al. |
| 2019/0196718 A1 | 6/2019 | Pai et al. |
| 2019/0207925 A1 | 7/2019 | Anantha Padmanaban et al. |
| 2019/0286832 A1 | 9/2019 | Szeto et al. |
| 2019/0332683 A1 | 10/2019 | Thummala et al. |
| 2019/0339883 A1 | 11/2019 | Aron |
| 2020/0007530 A1 | 1/2020 | Mohamad Abdul et al. |
| 2020/0012637 A1* | 1/2020 | Strauss ............... G06F 11/2094 |
| 2020/0034069 A1 | 1/2020 | Batra |
| 2020/0036647 A1 | 1/2020 | Gupta et al. |
| 2020/0081704 A1 | 3/2020 | Bafna et al. |
| 2020/0081733 A1 | 3/2020 | Buck |
| 2020/0106669 A1 | 4/2020 | Dhillon et al. |
| 2020/0125580 A1 | 4/2020 | Shao |
| 2020/0137157 A1 | 4/2020 | Joseph |
| 2020/0274869 A1 | 8/2020 | Tahenakos et al. |
| 2021/0081432 A1* | 3/2021 | Grunwald ............. G06F 16/273 |
| 2021/0141630 A1 | 5/2021 | Sharpe |
| 2021/0165759 A1 | 6/2021 | Bar-nissan et al. |
| 2021/0200641 A1 | 7/2021 | Bafna |
| 2021/0224233 A1 | 7/2021 | Bafna |
| 2021/0247973 A1 | 8/2021 | Gupta |
| 2021/0334178 A1 | 10/2021 | Yang |
| 2021/0344772 A1 | 11/2021 | Arikatla |
| 2021/0349859 A1 | 11/2021 | Bafna |
| 2021/0365257 A1 | 11/2021 | Gopalapura Venkatesh |
| 2021/0390080 A1 | 12/2021 | Tripathi |
| 2021/0397587 A1 | 12/2021 | Thummala |
| 2021/0406136 A1 | 12/2021 | Venkatesh |
| 2022/0004377 A1 | 1/2022 | Sharpe |
| 2022/0147342 A1 | 5/2022 | Sharpe et al. |
| 2022/0147495 A1 | 5/2022 | Sharpe et al. |
| 2022/0156107 A1 | 5/2022 | Bafna et al. |

FOREIGN PATENT DOCUMENTS

| | | | |
|---|---|---|---|
| CN | 105100210 | 11/2015 | |
| CN | 110516005 | 11/2018 | |
| CN | 110516005 | 11/2019 | |
| CN | 110519112 A | 11/2019 | |
| CN | 110519112 A * | 11/2019 | |
| CN | 110569269 | 12/2019 | |
| EP | 1214663 A2 * | 6/2002 | .......... G06F 11/2002 |
| EP | 1 229 443 A2 | 8/2002 | |
| EP | 1062581 | 10/2003 | |
| EP | 1214663 B1 | 6/2006 | |
| EP | 1979814 A2 | 10/2008 | |
| EP | 1979814 A2 * | 10/2008 | ............. G06F 9/526 |
| WO | WO 2010050944 | 5/2010 | |
| WO | WO-2010050944 A1 * | 5/2010 | .......... G06F 11/0727 |
| WO | WO 2011078646 A1 | 6/2011 | |
| WO | WO 2012126177 | 9/2012 | |
| WO | WO-2012126177 A2 * | 9/2012 | ....... G06F 16/24552 |
| WO | WO 2014200564 A1 | 12/2014 | |
| WO | WO 2016018446 | 2/2016 | |

(56) References Cited

FOREIGN PATENT DOCUMENTS

| WO | WO-2016018446 A1 | * | 2/2016 | ............ G06F 16/119 |
| WO | WO 2018014650 | | 1/2018 | |
| WO | WO 2020/180291 | * | 9/2020 | ............ G06F 16/14 |

OTHER PUBLICATIONS

U.S. Appl. No. 16/177,126, "Managing High-Availability File Servers," filed Oct. 31, 2018, Joseph et al. (Year: 2018).*
Notice of Allowance dated Dec. 8, 2021 for related U.S. Appl. No. 16/747,272.
Notice of Allowance for U.S. Appl. No. 16/177,126 dated May 26, 2022.
Citrix XenDesktop 7.1 on Microsoft Hyper-V Server 2012 R2 on Nutanix Virtual Computing Platform, dated Jun. 25, 2014.
U.S. Appl. No. 17/866,225 titled Virtualized File Server Disaster Recovery filed Jul. 15, 2022.
U.S. Appl. No. 17/865,907 titled "Virtualized File Server Deployment" filed Jul. 15, 2022, Attorney Docket No. 0076796-00701.
Hemmes, J., et al., "Cacheable Decentralized Groups for Grid Resource Access Control," Technical Report Jun. 2006, Department of Computer Science and Engineering, University of Notre Dame, dated 2006.
Lye, B., "Implementing Windows Server 2008 File System Quotas," Redgate, dated Nov. 19, 2009.
"VSAN File Services," VMwareStorage, VMWare, dated May 2020.
"Virtual Disk Manager User's Guide," Virtual Disk Development Kit, VMWare, copyright 2008.
Non-Final Office Action for U.S. Appl. No. 16/177,126 dated Sep. 16, 2022.
"Setting up and Using Acropolis File Services (AFS) on Nutanix AOS 5.0"; Virtual Dennis—Sharing Technical Tips Learned the Hard Way; Posted Dec. 30, 2016; pp. all.
Bas van Kaam "New in AOS 5.0: Nutanix Acropolis File Services"; basvankaam.com; Jan. 5, 2017; pp. all.
Ruth, Paul "Autonomic Live Adaptation of Virtual Computational Environments in a Multi-Domain Infrastructure"; 2006 IEEE International Conference on Autonomic Computing, 2006, pp. 5-14.
Illingworth, T., "Enable or disable SMB automatic node referrals," dated Dec. 9, 2021, URL: https://docs.netapp.com/ontap-9/index.jsp?topic=%2Fcom.netapp.doc.cdot-famg-cifs%2FGUID-AC7E8515-3A4C-4BB5-A8C8-38B565C952E0.html.
Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021.
Illingworth, T, "Guarantee throughput with QoS overview," dated Dec. 9, 2021, NetApp, URL: https://docs.netapp.com/ontap-9/index.jsp?topic=%2Fcom.netapp.doc.pow-perf-mon%2FGUID-77DF9BAF-4ED7-43F6-AECE-95DFB0680D2F.html.
"Manage workloads," NetApp, dated Oct. 14, 2021, URL: https://docs.netapp.com/ontap-9/index.jsp?topic=%2Fcom.netapp.doc.pow-perf-mon%2FGUID-13D35FC5-AF37-4BBD-8A8E-B10B41451A16.html.
"Backup vSAN 7 File Share with Veeam Backup & Replication 10," Sysadmin Stories, dated Jun. 2, 2020, URL: https://www.sysadminstories.com/2020/06/backup-vsan-7-file-share-with-veeam.html.
vSphere Storage; Update 2; VMware vSphere 7.0; VMware ESXi 7.0; vCenter Server 7.0; dated Jun. 25, 2021 https://docs.vmware.eom/en/VMware-vSphere/7.0/vsphere-esxi-vcenter-server-702-storage-guide.pdf.
VMWare Datasheet; https://www.vmware.com/content/dam/digitalmarketing/vmware/en/pdf/products/vCenter/vmware-vcenter-server-datasheet.pdf, captured Aug. 20, 2021.
"VSAN 7.0 U2 Proof of Concept Guide," dated Apr. 2021 https://images.core.vmware.com/sites/default/files/resource/vsan_70_u2_proof_of_concept_guide_noindex.pdf.

"vSAN Health Service—File Service—File Server Health (77165)," VMware, Knowledge Base, dated Oct. 4, 2021, URL: https://kb.vmware.com/s/article/77165.
Update 3, VMWare vSphere 6.7; VMware vSAN 6.7; dated Aug. 20, 2019, https://docs.vmware.com/en/VMware-vSphere/6.7/vsan-673-planning-deployment-guide.pdf.
"VSAN Stretched Cluster Guide," VMwareStorage, dated Jun. 2020, https://images.core.vmware.com/sites/default/files/resource/vsan_stretched_cluster_guide_noindex.pdf.
"The Wonderful World of Distributed Systems and the Art of Metadata Management," Nutanix, Inc., dated Sep. 24, 2015, URL: https://www.nutanix.com/blog/the-wonderful-world-of-distributed-systems-and-metadata-management.
Fojta, T. "Quotas and Quota Policies in VMware Cloud Director," Tom Fojta's Blog, dated Nov. 6, 2020.
Fojta, T., "vSAN File Services with vCloud Director," Tom Fojta's Blog, dated Apr. 6, 2020.
Hogan, C., New updates from Nutanix—NOS 3.0 and NX-3000, dated Dec. 20, 2012, URL: https://cormachogan.com/2012/12/20/new-from-nutanix-nos-3-0-nx-3000/.
Leibovici, A., "Nutanix One-Click Upgrade now takes care of Firmware and Hypervisor too!," myvirtualcloud.net, dated Jul. 31, 2014, URL: https://myvirtualcloud.net/nutanix-one-click-upgrade-now-takes-care-of-firmware-and-hypervisor-too/.
Rajendran, C, "Working with vSAN Health Checks," VMware vSan Virtual Blocks Blog, dated Jul. 18, 2019, URL: https://blogs.vmware.com/virtualblocks/2019/07/18/working-with-vsan-health-checks/.
Sturniolo, A., "VMware vSAN File Services and Veeam," Veeam Blog, dated Jul. 22, 2020, URL: https://www.veeam.com/blog/veeam-backup-vsan-file-services.html.
"Administering VMware vSAN, Update 1," VMWare, copyright 2020.
"Characteristics of a vSAN Cluster," VMWare, dated May 31, 2019.
"Native File Services for vSAN 7," cormachogan.com, dated Mar. 11, 2020.
"Nutanix Files Guide," Nutanix, dated Sep. 14, 2018.
Birk, R., "Understanding vSAN Architecture Components," VMWare, dated Feb. 28, 2018.
Seget, V., "VMWare vSAN 7 now with native file services and quotas," VMWare, dated May 1, 2020.
"VMWare vSAN 7.0 Release Notes," VMWare, dated Jun. 23, 2020.
Seget, V., "VMWare vSphere 7.0 and vSAN storage improvements," 4sysops, dated Apr. 1, 2020.
"VMWare vSphere VMFS Technical Overview and Best Practices," VMWare Technical White Paper, copyright 2012.
"Additional Use Cases and Support Using vSAN File Services," VMWare, copyright 2021.
vSphere Storage; Update 2; VMware vSphere 6.7; VMware ESXi 6.7; vCenter Server 6.7; dated Jan. 4, 2021.
vSphere Availibility, Update 1, VMWare, dated Jan. 11, 2019.
Screen captures from YouTube video clip entitled "Tech TopX: AHV One Click Upgrade," 13 pages, uploaded on Dec. 8, 2015 by user "Nutanix University". Retrieved from Internet: https://www.youtube.com/watch?v=3dALdzw6qZM.
"vSAN Performance Graphs in the vSphere Web Client," VMWare Knowledge Base, dated Nov. 9, 2020.
vSAN Monitoring and Troubleshooting, Update 1, VMWare vSphere 7.0, copyright 2020.
U.S. Appl. No. 17/443,009, titled "Scope-Based Distributed Lock Infrastructure for Virtualized File Server" filed Jul. 19, 2021, pp. all.
U.S. Appl. No. 17/580,555 titled "Virtualized File Server" filed Jan. 20, 2022.
U.S. Appl. No. 17/581,418 titled "File Server Managers and Systems for Managing Virtualized File Servers" filed Jan. 21, 2022.
U.S. Appl. No. 17/585,403 titled "Virtualized File Server Smart Data Ingestion" filed Jan. 27, 2022.
U.S. Appl. No. 17/648,796 titled "Virtualized Server Systems and Methods Including Scaling of File System Virtual Machines" filed Jan. 24, 2022.
Poitras, Steven. "The Nutanix Bible" (Sep. 9, 2022), from https://nutanixbible.com/ (Publication date based on indicated capture date by Archive.org; first publication date unknown).

(56) References Cited

OTHER PUBLICATIONS

Non-Final Office Action for U.S. Appl. No. 17/646,480 dated Sep. 27, 2022.
Final Office Action for U.S. Appl. No. 17/646,480 dated Jan. 20, 2023.
Notice of Allowance dated Jan. 24, 2023 for U.S. Appl. No. 16/177,126.
Non-final Office Action dated Jul. 7, 2015 for related U.S. Appl. No. 14/278,363.
Non-final Office Action dated Jul. 16, 2015 for related U.S. Appl. No. 14/584,466.
International Search Report and Written Opinion dated Aug. 20, 2015, for related PCT Patent Application No. PCT/US15/31096, 8 pages.
International Search Report and Written Opinion dated Aug. 26, 2015, for related PCT Patent Application No. PCT/US15/31096, 8 pages.
Final Office Action dated Feb. 25, 2016 for related U.S. Appl. No. 14/584,466.
Final Office Action dated Mar. 23, 2016 for related U.S. Appl. No. 14/278,363.
Notice Of Allowance and Fee(s) due dated Jul. 19, 2016 for related U.S. Appl. No. 14/206,869.
Lamport, Leslie "Paxos Made Simple," dated Nov. 1, 2001, 14 pages.
Alexander Shraer, et al., "Dynamic Reconfiguration of Primary/Backup Clusters," dated 2011, 13 pages.
Notice of Allowance and Fee(s) due dated Oct. 30, 2015 for related U.S. Appl. No. 14/144,520.
Wikipedia, "Compare-and-swap," Nov. 9, 2015, 6 pages.
International Search Report and Written Opinion dated Aug. 7, 2015, for corresponding PCT Patent Application No. PCT/US2015/030026, 10 pages.
Non-final Office Action dated Jul. 17, 2015 for related U.S. Appl. No. 14/206,869.
PCT International Search Report and Written Opinion dated Jun. 15, 2015 for related PCT Patent Application No. PCT/US2015/020139.
Final Office Action dated Jan. 25, 2016 for related U.S. Appl. No. 14/206,869.
Non-final Office Action dated Sep. 22, 2016 for related U.S. Appl. No. 14/584,466.
Citrix, "Citrix XenServer 6.0 Administrator's Guide", Copyright 2012 Citrix Systems, Inc., 207 pages.
John L Hufferd, Hufferd Enterprises, SNIA, "IP Storage Protocols: iSCSI", Copyright 2011 Storage Networking Industry Association, 46 pages.
VMware, Technical White Paper, "Multipathing Configuration for Software iSCSI Using Port Binding", Copyright 2012 Vmware, Inc., 15 pages.
Non-final Office Action dated Oct. 7, 2016 for related U.S. Appl. No. 14/278,363.
Notice of Allowance and Fee(s) due dated Oct. 24, 2016 for related U.S. Appl. No. 14/206,869.
Non-final Office Action dated Nov. 1, 2016 for related U.S. Appl. No. 14/708,091.
Notice of Allowance and Fee(s) due dated Apr. 5, 2017 for related U.S. Appl. No. 14/584,466.
Ajmani et al., "Scheduling and Simulation: How to Upgrade Distributed Systems," HotOS IX: The 9th Workshop on Hot Topics in Operating Systems, USENIX, 2003, pp. 43-48.
Kochut, Andrzej and Alexei Karve, "Leveraging Local Image Redundancy for Efficient Virtual Machine Provisioning," 2012 IEEE Network Operations and Management Symposium, Jun. 8, 2012, pp. 179-187.
Soules et al.; "Metadata Efficiency in a Comprehensive Versioning File System", May 2002, CMU-CS-02-145, School of Computer Science, Carnegie Mellon University, Pittsburgh, PA 15213, 33 pages.
Notice of Allowance and Fee(s) due dated Apr. 10, 2017 for related U.S. Appl. No. 14/278,363.
Final Office Action dated Apr. 20, 2017 for related U.S. Appl. No. 14/708,091.
Notice of Allowance and Fee(s) due dated May 15, 2017 for related U.S. Appl. No. 15/069,961.
Non-Final Office Action dated Jan. 26, 2017 for related U.S. Appl. No. 15/069,961.
Non-Final Office Action dated Jul. 12, 2017 for related U.S. Appl. No. 14/610,285.
European Search Report dated May 5, 2017 for related EP Application No. 15792334.3, 13 pages.
European Search Report dated May 19, 2017 for related EP Application No. 15788922.1, 11 pages.
Non-Final Office Action dated Aug. 24, 2017 for related U.S. Appl. No. 14/708,091.
Final Office Action dated Jan. 9, 2018 for related U.S. Appl. No. 14/610,285.
European Extended Search Report dated Jan. 15, 2018 for related EP Application No. 15762234.1, 19 pages.
Final Office Action dated Feb. 27, 2018 for related U.S. Appl. No. 14/708,091.
Advisory Action dated May 18, 2018 for related U.S. Appl. No. 14/708,091.
Non-Final Office Action dated Jun. 7, 2018 for related U.S. Appl. No. 15/294,422.
Non-Final Office Action dated Jun. 29, 2018 for related U.S. Appl. No. 15/160,347.
Notice of Allowance dated Sep. 6, 2018 for related U.S. Appl. No. 14/708,091, 8 pages.
First Office Action dated Jul. 30, 2018 for related European Application No. 15762234.1, 6 pages.
Non-Final Office Action dated Nov. 14, 2018 for related U.S. Appl. No. 15/678,893, 7 pages.
Notice of Allowance dated Nov. 20, 2018 for related U.S. Appl. No. 15/294,422, 7 pages.
Intention to Grant dated Jan. 3, 2019 for related EP Application No. 15792334.3, 7 pages.
Final Office Action dated Jan. 28, 2019 for related U.S. Appl. No. 15/160,347, 16 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Notice of Allowance dated Mar. 20, 2019 for related U.S. Appl. No. 15/678,893, 5 pages.
Notice of Allowance dated Mar. 26, 2019 for related U.S. Appl. No. 15/294,422, 7 pages.

(56) References Cited

OTHER PUBLICATIONS

Non-Final Office Action dated Sep. 6, 2019 for related U.S. Appl. No. 15/160,347.
Notice of Allowance dated Nov. 19, 2019 for related U.S. Appl. No. 14/708,091.
Notice of Allowance dated Dec. 27, 2019 for related U.S. Appl. No. 14/610,285.
Final Office Action dated Mar. 16, 2020 for related U.S. Appl. No. 15/160,347.
E.S., "Nutanix Two-Node Clusters", (Jun. 18, 2018), from http://vpash.com/nutanix/nutanix-two-node-clusters/, pp. all.
Configuring a Witness (two-node cluster) (Jul. 16, 2018), 3 pages.
Gupta, Upasna. "Unlocking the ROBO/Edge IT Landscape with the Launch of Nutanix 1-node Cluster" (Jan. 19, 2018), 7 pages.
Liu, M. "Fine-Grained Replicated State Machines for a Cluster Storage System", in the *Proceedings of the 17th USENIX Symposium on Networked Systems Design and Implementation (NSDI '20)*, (Feb. 25-27, 2020).
Junqueira, F. P., "Zab: High-performance broadcast for primary-backup systems", *2011 IEEE/IFIP 41st International Conference on Dependable Systems & Networks (DSN)*, (Jun. 27-30, 2011).
Redis, "Redis Sentinel Documentation", (Jul. 23, 2012), date retrieved from google.
RABBITMQ, "Quorum Queues", (Nov. 14, 2019), date retrieved from google.
Cao, W.,"PolarFS: An Ultra-low Latency and Failure Resilient Distributed File System for Shared Storage Cloud Database", *Proceedings of the VLDB Endowment*, vol. 11, No. 12, (Aug. 2018).
Alibaba Cloud, "AliSQL X-Cluster: An MySQL Database with Superior Performance and Strong Consistency", (Dec. 8, 2019).
Cano, I. et al., "Curator: Self-Managing Storage for Enterprise Clusters", *14th USENIX Symposium on Networked Systems Design and Implementation, NSDI '17*, (Mar. 27, 2017).
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Final Office Action dated Aug. 5, 2020 for U.S. Appl. No. 16/041,348.
Notice of Allowance dated Nov. 4, 2020 for related U.S. Appl. No. 15/160,347.
Mizrak, A. T et al., "VMware vCenter Server High Availability Performance and Best Practices", VMware Server 6.5, Performance Study, VMware, (Nov. 2016).
VMware, "vSAN Planning and Deployment", VMware vSphere 7.0, VMware vSAN 7.0, VMware, Inc., (Apr. 2, 2020).
VMware, "VMware Infrastructure, Automating High Availability (HA) Services with VMware HA", VMware Technical Note, (Revised on Jun. 5, 2006).
VMware, "VMware® High Availability (VMware HA): Deployment Best Practices", VMware® vSphere™ 4.1, Technical White Paper, (Dec. 10, 2010), date retrieved from google.
Potheri, M. et al., "VMware vCenter Server™ 6.0, Availability Guide", Technical Marketing Documentation, Version 1.0, (May 2015).
McCarty, J., "VMware® Virtual SAN™ Stretched Cluster: Bandwidth Sizing Guidance". Technical White Paper, VMware, (Jan. 26, 2016), date retrieved from google.
McCarty, J., "VMware® Virtual SAN™ 6.1 Stretched Cluster & 2 Node Guide", Storage and Availability Business Unit, VMware, v 6.1.0c, version 0.20, (Jan. 2016).
Dell: "High Availability and Data Protection With Dell EMC Isilon Scale-Out NAS", (Jul. 2018), Dell Inc.
JCosta et al., "High Availability Setup Using Veritas Cluster Server and NetApp Synchronous SnapMirror—One button Failover-Failback with SnapMirror Sync and Veritas Cluster Server", (Nov. 18, 2010), NetApp Community.
NetApp: "Preparing storage systems for SnapMirror replication", (Jul. 2015), NetApp, Inc.

Bounds, J., "High-Availability (HA) Pair Controller Configuration Overview and Best Practices", (Feb. 2016), NetApp, Inc.
Netapp, "Clustered Data ONTAP 8.2 File Access Management Guide for CIFS", NetApp, Inc., (Feb. 2014).
Jung, Y. et al. "Standard-based Virtual Infrastructure Resource Management for Distributed and Heterogeneous Servers", ICACT, (Feb. 15, 2009).
Dell EMC, "Dell EMC Isilon OneFS Operating System, Scale-out NAS to maximize the data capital and business value of your unstructured data", Data Sheet, (Jan. 31, 2019), date retrieved from google.
Dell EMC, "Dell EMC Isilon OneFS Operating System, Powering the Isilon Scale-Out Storage Platform", White Paper, (Dec. 2019).
EMC, "EMC Isilon OneFS Operating System, Powering scale-out storage for the new world of Big Data in the enterprise", Data Sheet, (Apr. 2013).
EMC, Isilon OneFS, Version 8.0.1, Web Administration Guide, EMC Corporation, (Oct. 2016).
Netapp, "Enabling or disabling SMB automatic node referrals", ONTAP 9 Documentation Center, NetApp, Inc., (Updated Dec. 2020), from https://docs.netapp.com/ontap-9/index.jsp?topic=%2Fcom.netapp.doc.cdot-famg-cifs%2FGUID-AC7E8515-3A4C-4BB5-A8C8-38B565C952E0.html.
Netapp, "Guaranteeing throughput with QoS", ONTAP 9 Documentation Center, NetApp, Inc., (Updated Dec. 2020), from https://docs.netapp.com/ontap-9/index.jsp?topic=%2Fcom.netapp.doc.pow-perf-mon%2FGUID-77DF9BAF-4ED7-43F6-AECE-95DFB0680D2F.html.
NetApp. "How to troubleshoot the 'Autolocation' feature in Clustered Data ONTAP", Knowledgebase, NetApp, (Jun. 4, 2019).
NetApp. "How to troubleshoot the 'Autolocation' feature in Clustered Data ONTAP—Results", Knowledgebase, NetApp, (Captured on Sep. 19, 2019).
Cloudian, "Hybrid Cloud Storage with Cloudian HyperStore and Amazon S3", Solution Brief, Cloudian Inc., (Aug. 2015).
NetApp, "Improving client response time by providing SMB automatic node referrals with Auto Location", NetApp, Inc., (May 2013), from https://library.netapp.com/ecmdocs/ECMP1196891/html/GUID-0A5772A4-A6D7-4A00-AC2A-92B868C5B3B5.html.
NetApp, "Managing Workloads", ONTAP 9 Documentation Center, NetApp, Inc., (Updated Dec. 2020), from https://docs.netapp.com/ontap9/index.jsp?topic=%2Fcom.netapp.doc.pow-perf-mon%2FGUID-13D35FC5-AF37-4BBD-8A8E-B10B41451A16.html.
Nutanix, "Nutanix AFS—Introduction & Steps For Setting Up", (Jan. 3, 2018), from https://virtual building blocks.com/2018/01/03/nutanix-afs-introduction-steps-for-setting-up/.
NetApp, "Protect Your Data with NetApp Element Software", Solution Brief, NetApp, (Oct. 11, 2020), date retrieved from google.
Kemp, E., "NetApp SolidFire SnapMirror Architecture and Configuration", Technical Report, NetApp, (Dec. 2017).
Kleyman, B., "How Cloud Computing Changes Storage Tiering", DataCenter Knowledge, (Nov. 12, 2015).
Poitras, Steven. "The Nutanix Bible" (Aug. 1, 2020), from https://nutanixbible.com/ (Publication date based on indicated capture date by Archive.org; first publication date unknown).
Virtuadmin, "Configure VCenter High Availability", Virtubytes, (Sep. 14, 2017).
Non-Final Office Action dated Sep. 30, 2020 for related U.S. Appl. No. 16/177,126.
Notice of Allowance dated Mar. 3, 2021 for U.S. Appl. No. 16/041,348.
Notice of Allowance dated Mar. 10, 2021 for related U.S. Appl. No. 15/160,347.
Rivera, R., "VMware Virtual SAN: Witness Component Deployment Logic", VMware vSphere Bloi, (Apr. 1, 2014).
Page, M. "EMC VPLEX Witness Deployment Within VMware VCloud Air", White Paper, EMC, (Oct. 7, 2016).
EMC, "EMC VPLEX Witness Deployment Within VMware VCloud Air", White Paper, EMC, (Jul. 2013).
"New VMware HCL category: vSphere Metro Stretched Cluster", Virtual Geek, (Oct. 5, 2011).

(56) References Cited

OTHER PUBLICATIONS

Lakkapragada, S. et al., "Site Recovery Manager and Stretched Storage: Tech Preview of a New Approach to Active-Active Data Centers", VMware, (Nov. 2014).
Epping, D., "Stretched vCloud Director Infrastructure", VMware, (Jan. 23, 2013).
Bernasconi, A. et al., "IBM SAN and SVC Stretched Cluster and VMware Solution Implementation", IBM Redbooks, (Apr. 2013).
Ashish, S. et al., "IBM SAN Volume Controller Stretched Cluster with PowerVM and PowerHA", IBM Redbooks, (Jul. 2013).
Dell, "Multi-AZ (stretched cluster)", Architecture Guide-VMware Cloud Foundation 3.10.01 on VxRail, Dell Technologies, (Oct. 2001).
Daveberm, "Step-By-Step: Configuring a 2-NODE Multi-Site Cluster on Windows Server 2008 R2—PART 1", Clustering for Mere Mortals, (Sep. 15, 2009).
"Failover Clustering (III)", Networks & Servers Blog, (Sep. 2011).
Sarmiento, E., "Force Start a Windows Server Failover Cluster without a Quorum to bring a SQL Server Failover Clustered Instance Online", (Aug. 22, 2014).
Horenbeeck, M. V., "Spooky! The Curious Case of the 'Ghost' File Share Witness . . . ", (Jul. 15, 2014).
VMware, "Administering VMware Virtual SAN: VMware vSphere 6.5, vSAN 6.6", VMware, (Jun. 26, 2017).
Littman, M. L., "The Witness Algorithm: Solving Partially Observable Markov Decision Process", Brown University, (Dec. 1994).
Oracle, "Deploying Microsoft SQL Server Always On Availability Groups", Oracle White Paper, (Sep. 2018).
EnterpriseDB, "EDB Failover Manager Guide: Failover Manager Version 2.0.3", EnterpriseDB Corporation, (Dec. 18, 2015).
"Explaining the Stormagic SvSAN Witness", White Paper, (Aug. 29, 2018).
"2016 Failover cluster using Azure blob as a cluster quorum", Teckadmin, (Mar. 31, 2019).
Deschner, G. et al., "Calling the Witness: SMB3 Failover with Samba/CTDB", Redhat, (Oct. 2, 2015).
Microsoft, "High Availability Solutions: SQL Server 2012 Books Online", Microsoft (Jun. 2012).
Mitchell, D., "Introduction to VMware vSAN™ for VMware Cloud Providers ™," Version 2.9, VMware, (Jan. 2018).
Mitchell, D., "Introduction to VMware vSAN™ for VMware vCloud Air™ Network", Version 2.7, VMware, (Feb. 2017).
Paderin, M. "Analysis of Server Clustering Its Uses and Implementation", Bachelor's thesis Information Technology, (Dec. 2017).
VMware, "Virtualizing Microsoft Applications on VMware Virtual SAN", Reference Architecture, VMware, (Apr. 2, 2015).
Deschner, G., "Implementing the Witness protocol in Samba", Redhat, (Jun. 22, 2015).
Deschner, G., "Cluster improvements in Samba4", Redhat, (May 30, 2016).
Ngyuen, L., "SMB 3 Transparent Failover for Hitachi NAS Platform 4000 Series", Tech Note, Hitachi Data Systems, (Nov. 2016).
McCarty, J. "VMware Horizon 6 with App Volumes and Virtual SAN Reference Architecture", Storage and Availability Business Unit, VMware (Jan. 2016).
VMware, "VMware Horizon 6 with App Volumes and Virtual SAN Reference Architecture", Technical White Paper, VMware, (Apr. 9, 2011), date retrieved from google.
Feroce, D., "Leveraging VMware vSAN™ for Highly Available Management Clusters", Version 2.9, VMware, (Jan. 2018).
VMware, "Deployment for Multiple Availability Zones", VMware Validated Design for Software-Defined Data Center 4.3, VMware, (Jul. 17, 2018).
Hogan, C., "VMware Virtual SAN Health Check Guide", Storage and Availability Business Unit, V 6.1.0, VMware, (Sep. 2015).
Banerjee, A. et al., "VMware Virtual SAN™ Stretched Cluster: Performance and Best Practices", Technical White Paper, VMware, (Oct. 22, 2015).
Hosken, M., "VMware vSAN™ Two-Node Architecture VMware Cloud Provider™ Use Cases", Version 2.9, VMware, (Jan. 2018).
"VMware Virtual SAN 6.2", Licensing Guide, VMware, (Revised Jun. 2016).
Hunter, J., "VMware Virtual SAN 6.2", PCI DSS Compliance Guide, (Revised Feb. 2016).
"VMware Virtual SAN: SAP Applications", Solution Overview, VMware, (May 6, 2016).
Eckerle, A. et al., "What's New in VMware vSphere® 6.5", Technical White Paper, (Nov. 15, 2016).
Notice of Allowance dated Jun. 24, 2021 for related U.S. Appl. No. 16/041,348.
Notice of Allowance dated Aug. 4, 2021 for related U.S. Appl. No. 15/160,347.
Non-Final Office Action dated Aug. 5, 2021 for related U.S. Appl. No. 16/747,272.
Non-Final Office Action dated Feb. 4, 2020 for U.S. Appl. No. 16/041,348.
Final Office Action dated Apr. 26, 2021 for related U.S. Appl. No. 16/177,126.
U.S. Appl. No. 17/129,425 titled "Parallel Change File Tracking in a Distributed File Server Virtual Machine (FSVM) Architecture" filed Dec. 21, 2020.
U.S. Appl. No. 16/942,929 titled "Method Using Access Information in a Distributed File Server Virtual Machine (FSVM) Architecture, Including Web Access"; filed Jul. 30, 2020.
U.S. Appl. No. 16/944,323 titled "Actions Based On File Tagging in a Distributed File Server Virtual Machine (FSVM) Environment", filed Jul. 31, 2020.
U.S. Appl. No. 17/091,758 titled "Virtualized File Server Distribution Across Clusters", filed Nov. 6, 2020.
Notice of Allowance for U.S. Appl. No. 16/177,126 dated Apr. 12, 2023.

* cited by examiner

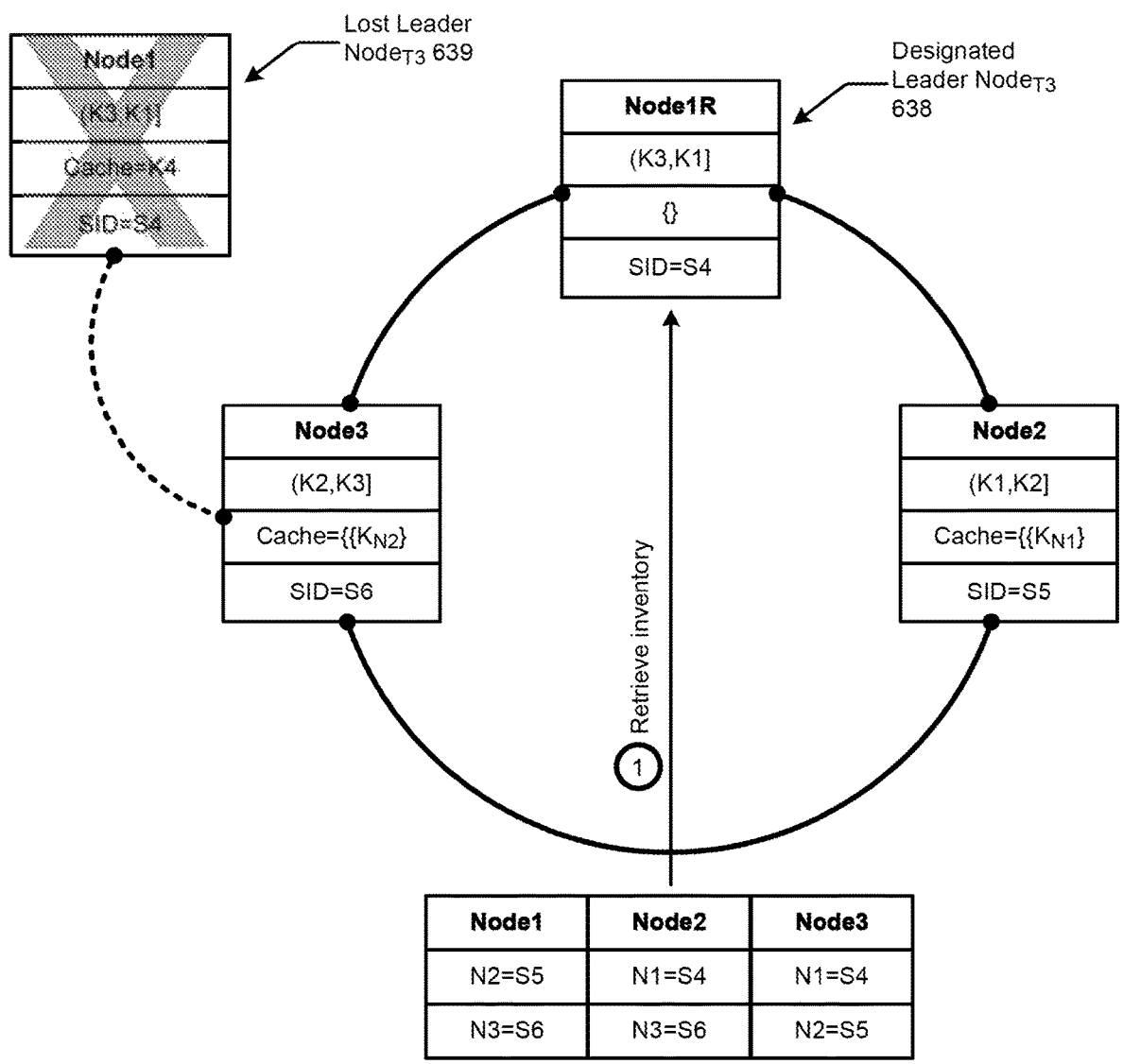
FIG. 6B1

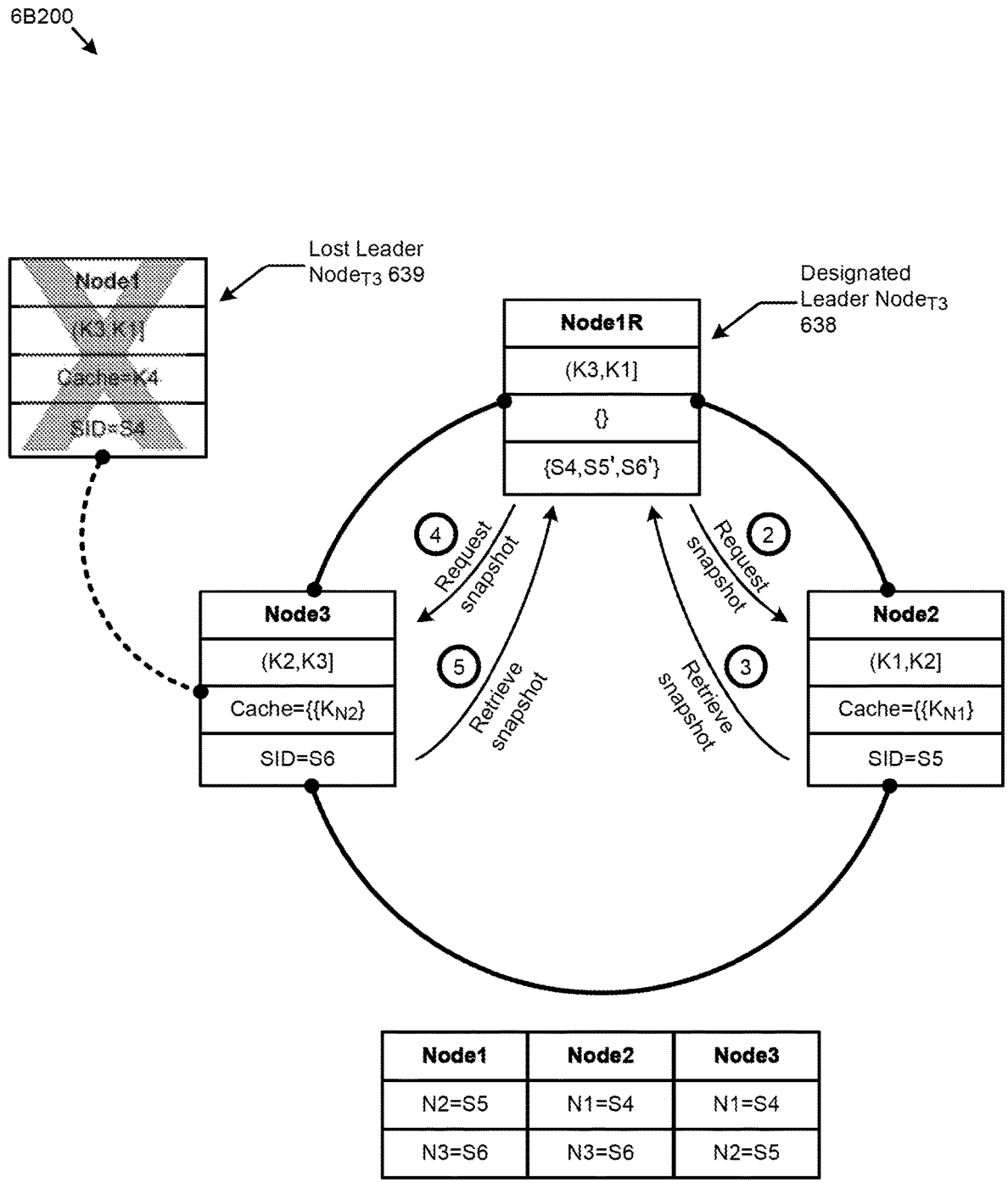
FIG. 6B2

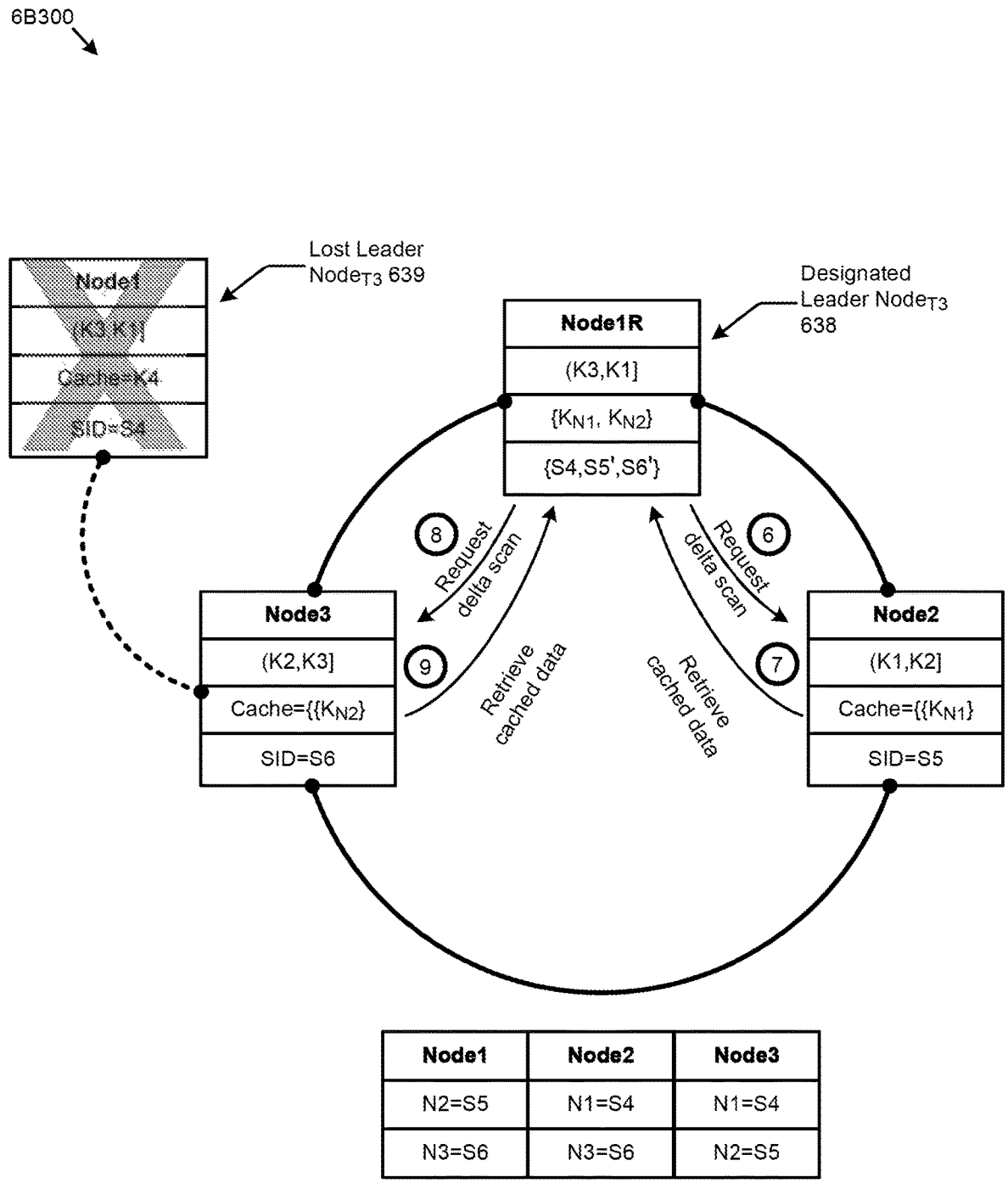
FIG. 6B3

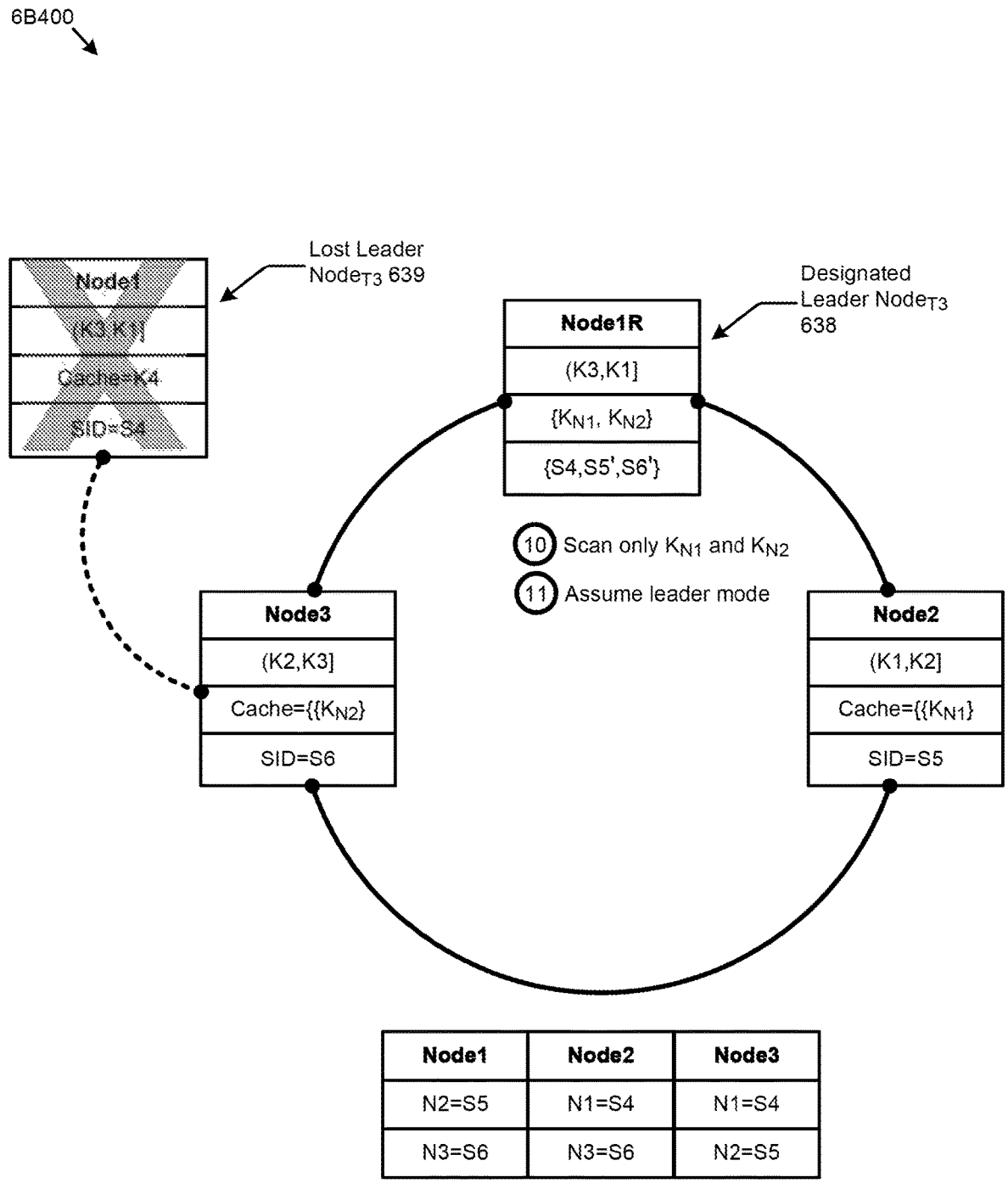
FIG. 6B4

MANAGING INCREMENTAL SNAPSHOTS FOR FAST LEADER NODE BRING-UP

RELATED APPLICATIONS

The present application claims the benefit of priority to U.S. patent application Ser. No. 63/022,315 titled "DELTA SCANS FOR ACHIEVING LEADER-ONLY READ MODE", filed on May 8, 2020, which is hereby incorporated by reference in its entirety.

TECHNICAL FIELD

This disclosure relates to computer cluster data management, and more particularly to techniques for managing incremental key-value snapshots for fast leader node bring-up.

BACKGROUND

In recent years, computing systems have grown to become large-scale distributed systems that use thousands of servers to process millions of data requests in a continuous and "always-up" fashion. In addition to being faster than past computing systems, these new distributed systems are also more robust because data items are replicated and stored at multiple physical locations, thus ensuring data is never lost, even in the event of a disaster.

In such distributed systems, it is necessary to ensure that data stored in multiple physical locations agree on the values corresponding to the data requests. For example, if an individual's bank account balance is stored as a data item at three geographically separate data centers and the individual deposits $100,000 into their account, then ensuring that all three data centers reflect the updated value is of paramount importance. If the data message to "increase the bank account balance by $100,000" is received at only one of the three data centers and is lost in transmission to the other two data centers, a data conflict occurs and it may be unclear which data center contains the correct value for the bank account data.

Various consensus-based algorithms and protocols have been implemented in an attempt to solve data conflict problems. Generally, consensus algorithms (e.g., Paxos), work by requiring nodes (e.g., servers) to vote or arbitrate amongst themselves to form a consensus as to what the correct value is for a given piece of data. For example, in a five-node (e.g., five server) system, if three out of five nodes reflect a deposit update of $100,000, those three out of five nodes constitute a majority and the remaining two out of five nodes will agree to also reflect the $100,000 update—whether or not a message to update the account by $100,000 was received directly by the two remaining nodes.

Even though consensus algorithms may ensure higher data accuracy, they are computationally expensive because every data value that needs to be processed must be arbitrated and/or voted on multiple times, which creates an enormous amount of network traffic. The computing expenses increase unboundedly as more and more data is being managed over more and more computing nodes. One approach to reducing the aforementioned network traffic is to establish a leader-follower relationship between the nodes, and then to process all data READ requests at the leader. Once the leader has a data value that has been agreed to by all of the followers, the leader can service all data READs without having to repeat the consensus algorithm.

While using a leader node in such a mode greatly improves overall system performance, it has undesirable characteristics that result from having a single point of failure. Some of the undesirable characteristics that result from having a single point of failure can be ameliorated by having backups of data that can be used to bring up a replacement leader node in the event of the failure of a leader. Use of backups, however leads to the scenario where the backup is out of date. An out-of-date backup can be used to bring up a new leader, however all of the data in the out-of-date back up would need to be checked ("scanned") such that value by value, a voting or consensus algorithm arrives at an up-to-date value that is in agreement by all nodes that hold a copy of the subject data. A value by value consensus or quorum must be reached before the replacement leader can assume the responsibilities of a fully-functioning leader node.

Unfortunately, this checking ("scanning") of the data on a value by value basis becomes enormously expensive, especially as the size of the data grows and/or as the number of participating nodes increases. What is needed is an approach or approaches that provide uncompromised data accuracy while still providing fast replacement node bring-up in the event of a leader node's failure or disconnection from the network.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products the manage incremental snapshots for fast leader node bring-up, which techniques advance the relevant technologies to address technological issues with legacy approaches. Certain embodiments are directed to technological solutions for managing incremental snapshots to accomplish fast leader node bring-up into a leader mode.

The disclosed embodiments modify and improve over legacy approaches. In particular, the herein-disclosed techniques provide technical solutions that address the technical problem of how avoid extensive key-value scan operations when bringing up a replacement leader node. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demands for computer memory, reduce demands for computer processing power, reduce network bandwidth usage, and reduce demands for intercomponent communication. Specifically, by avoiding extensive key-value scan operations when bringing up a replacement leader node, both memory usage and CPU cycles demanded are significantly reduced as compared to the memory usage and CPU cycles that would be needed but for practice of the herein-disclosed techniques. This is because, since key-value scan operations are computationally expensive, any technique that avoids unnecessary key-value scan operations also avoids unnecessary consumption of computing resources.

Many of the herein-disclosed embodiments for bringing up a new leader node by applying incremental snapshots are technological solutions pertaining to technological problems that arise in the hardware and software arts that underlie clustered computing systems. Aspects of the present disclosure achieve performance and other improvements in peripheral technical fields including, but not limited to deployment and management of hyperconverged computing platforms.

Some embodiments include a sequence of instructions that are stored on a non-transitory computer readable medium. Such a sequence of instructions, when stored in memory and executed by one or more processors cause the one or more processors to perform a set of acts for bringing up a new leader node by applying incremental snapshots.

Some embodiments include the aforementioned sequence of instructions that are stored in a memory, which memory is interfaced to one or more processors such that the one or more processors can execute the sequence of instructions to cause the one or more processors to implement acts for bringing up a new leader node by applying incremental snapshots.

In various embodiments, any combinations of any of the above can be combined to perform any variations of acts for managing incremental snapshots for fast leader node bring-up into a leader mode, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 6B1, FIG. 6B2, FIG. 6B3, and FIG. 6B4 depict a leader bring-up technique as used in systems that employ incremental snapshots for fast leader node bring-up into a leader mode, according to an embodiment.

DETAILED DESCRIPTION

Figure 1A:
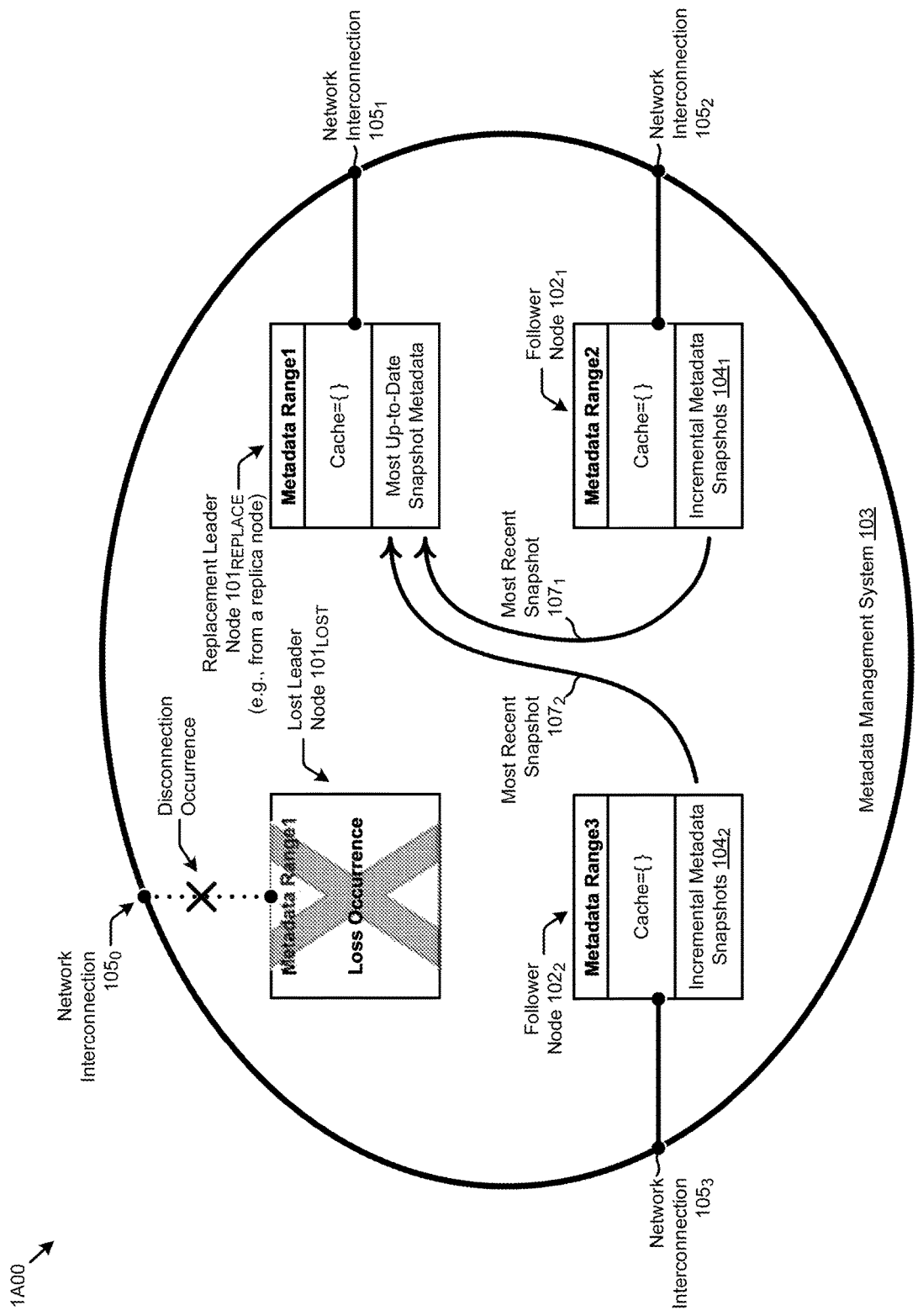
FIG. 1A shows a ring topology of nodes that are configured to maintain incremental snapshots for fast leader node bring-up into a leader mode, according to an embodiment.

Aspects of the present disclosure solve problems associated with using computer systems for avoiding extensive key-value scan operations when bringing up a replacement leader node. These problems are unique to, and may have been created by, various computer-implemented methods for performing scan/consensus operations when bringing up a replacement leader node in the context of clustered computing systems. Some embodiments are directed to approaches for bringing up a new leader node by applying incremental snapshots. The accompanying figures and discussions herein present example environments, systems, methods, and computer program products for managing incremental snapshots for fast leader node bring-up into a leader mode.

Overview

Computing clusters formed of many computing nodes that share a common storage pool often employ many distributed metadata maintenance agents to manage ongoing changes to the storage pool. Often, many such distributed metadata maintenance nodes can be deployed where each metadata maintenance node is assigned responsibility for a range (e.g., shard) of keys. For example, a first metadata maintenance node might be assigned to handle keys in the range (A-H), whereas a second metadata maintenance node might be assigned to handle keys in the range (H-P), and a third metadata maintenance node might be assigned to handle keys in the range (P-A]. As such, the nodes collectively share the load attendant to handling key (e.g., READs and WRITEs of a value corresponding to a key). In many computing cluster topologies, these metadata maintenance nodes are organized into a logical ring structure where each metadata maintenance node is in network communication with both a successor node as well as a predecessor node.

In many situations, some of which are described in detail hereunder, one of the metadata maintenance nodes can be assigned as a leader node that is configured to take on the duties of handling all READ requests for any key range. Handling of READ requests often does not require storage I/O (input/output or IO) and, as such, there are many deployments where a designated leader node can handle all READ requests for any key range without incurring storage I/O at all. This is especially true in situations where the value corresponding to a key is relatively small. Indeed, in such situations, it often happens that handling a READ request can be performed by accessing node-local memory to retrieve the value of a requested key.

In some embodiments, specifically when implementing a leader READ-all mode, the leader is able to service read requests from its local data store without having to run a consensus algorithm to determine the validity of the data. This is possible because, before getting into the leader READ-all mode, the leader ensures that the leader's own local copy of the data is not only up-to-date, but is also in agreement with the other nodes of the ring. In this mode the leader is configured to service all READ requests for any metadata corresponding to any range or shard. The other nodes of the ring take on the responsibilities of a follower node (e.g., to service WRITES to their particular assigned range or shard).

In other embodiments, specifically when implementing a leader in a leader-only READ mode for a particular range or shard of metadata, the leader is able to service read requests for its particular range of metadata using data from its local data store, without having to run a consensus algorithm to determine the validity of the data. This is possible because, before getting into the leader-only READ mode, the leader ensures that the leader's own local copy of the data for particular range of metadata is not only up-to-date, but is also in agreement with its replicas that are assigned to the same particular range or shard of metadata. When a designated leader node actually takes-on the leader responsibility to handle a leader-only READ mode to service READ requests corresponding to particular range of metadata, other nodes of the ring may take on the responsibilites of a leader-only READ mode to service READS from their particular range or shard of metadata.

Solution Overview

The herein-disclosed solutions include schemes where each of many distributed metadata maintenance agents can take snapshots of their own current metadata (e.g., metadata for a distributed file system), which snapshots can be retrieved by any other metadata maintenance agent running on any distributed metadata maintenance node. Specifically, each distributed metadata maintenance agent periodically invokes a snapshot operation on itself to create incremental snapshots of its data that comprise only data that had changed during a "delta" period. These snapshot IDs (and access to the data underlying a particular snapshot) are made available to all clients.

A distributed metadata maintenance node in a leader READ-all mode can confirm that its full set of metadata are up to date by first retrieving snapshots from the follower nodes, and then by performing "delta scans" over the follower nodes to retrieve only the data that was new or had changed since the latest snapshot was formed. In this case, the distributed metadata maintenance node in a leader READ-all mode need only scan (e.g., achieve consensus over) the data that was new or had changed since the latest snapshot was formed. Application of this technique results in extremely fast bring-up of a new distributed metadata maintenance node in a leader READ-all mode.

This technique can be employed in systems that are configured for high availability, even if the node that is designated to perform in a leader READ-all mode goes "down" or is disconnected from the ring. Specifically, fast recovery from the loss of a leader can be accomplished by bringing up a new leader node into a verified, then-current data state by (1) retrieving the most recent incremental snapshots, then (2) retrieving any more recent metadata, and then (3) performing scan consensus operations over just the more recent metadata.

As used herein, the term "snapshot" refers to a collection of metadata entries that were captured at a particular point in time. Multiple snapshots taken at different times result in incremental snapshots that may contain metadata entries that have different metadata values for the same key. As used herein a snapshot contains metadata in the form of keys and respective values. Each metadata entry is associated with a relative time (e.g., a first time, a second time, etc.).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

The foregoing mechanism to designate a replacement computing node to perform in a leader mode in event of a loss of a previously-designated leader can be accomplished by first, identifying a replacement node, and then bringing up the replacement node into a verified, then-current data state suited for performance in a leader mode. Once the verified data state suited for performance in a leader mode has been established, then the newly designated and newly configured node operates in a leader mode while the other nodes of the ring operate as followers.

FIG. 1A shows a ring topology 1A00 of nodes that are configured to maintain incremental snapshots for fast leader node bring-up into a leader READ-all mode. As an option, one or more variations of the ring topology or any aspect thereof may be implemented in the context of the architecture and functionality of the embodiments described herein and/or in any in any environment.

FIG. 1A is being presented to illustrate how a metadata management system 103 can be formed of several independently operating computing nodes, each of which independently operating computing nodes are connected onto a network in a ring topology overlaying a cluster of computing nodes. Indeed, there may be many other nodes in the cluster (not shown) that operate on metadata, such as by raising new key-value metadata to be maintained by the metadata management system, and/or such as by raising READ requests to access values corresponding to keys.

As shown, computing nodes are arranged in a ring topology formed of interconnected computing nodes, where each interconnected computing node is in network communication through a node-specific network interconnection to the ring (e.g., network interconnection $105_0$, network interconnection $105_1$, network interconnection $105_2$, network interconnection $105_3$). As earlier indicated, it can happen that a computing node that had been designated to perform in a leader mode goes "down" or is disconnected from the ring such that the non-leader nodes can detect loss occurrence or a disconnection occurrence of the ring's leader. This is shown by the presence of lost leader node $101_{LOST}$, which had been assigned a shard corresponding to metadata range1. The loss of this ring's leader means that, in order to restore the former set of interconnections between nodes, and to cover all metadata ranges, a new leader would need to be brought into the ring. As an illustrative example, such a new leader is shown as replacement leader node $101_{REPLACE}$. Using the techniques discussed herein, this replacement computing node is configured to replace the downed or disconnected node, and is further configured to manage a verified, then-current data state by retrieving incremental snapshots (incremental snapshot $104_1$, incremental snapshot $104_2$) from the non-leader nodes (e.g., follower node $102_1$, follower node $102_2$).

It takes a non-zero amount of time between detection of a downed leader node and the establishment of a replacement leader node. As such, it can happen that new keys and/or new values corresponding to previously seen keys are received by follower node $102_1$ and/or by follower node $102_2$. As such, to bring the replacement leader node up to date, the replacement leader node retrieves any of the most recent snapshots from the followers. Specifically, and as shown, the replacement leader node $101_{REPLACE}$ receives a most recent snapshot $107_1$ from follower node $102_1$ and a most recent snapshot $107_2$ from follower node $102_2$, from which snapshots the replacement leader node can build a verified, then-current, most up-to-date snapshot metadata state for the entire range of the metadata.

In the specific embodiment of FIG. 1A, each node is configured to have a cache area and a snapshot metadata area. The cache area is often implemented using a first data structure type that is stored in a high-performance random access memory (non-persistent RAM) area, whereas the snapshot metadata area is often implemented using a second data structure type that is stored in a durable, persistent storage area. Data in the cache area is periodically flushed to an incremental metadata snapshot. One possible organization of the foregoing first data structure type and second data structure type, as well as one possible technique for cache flushing, is shown and described as pertains to FIG. 1B.

Figure 1B:
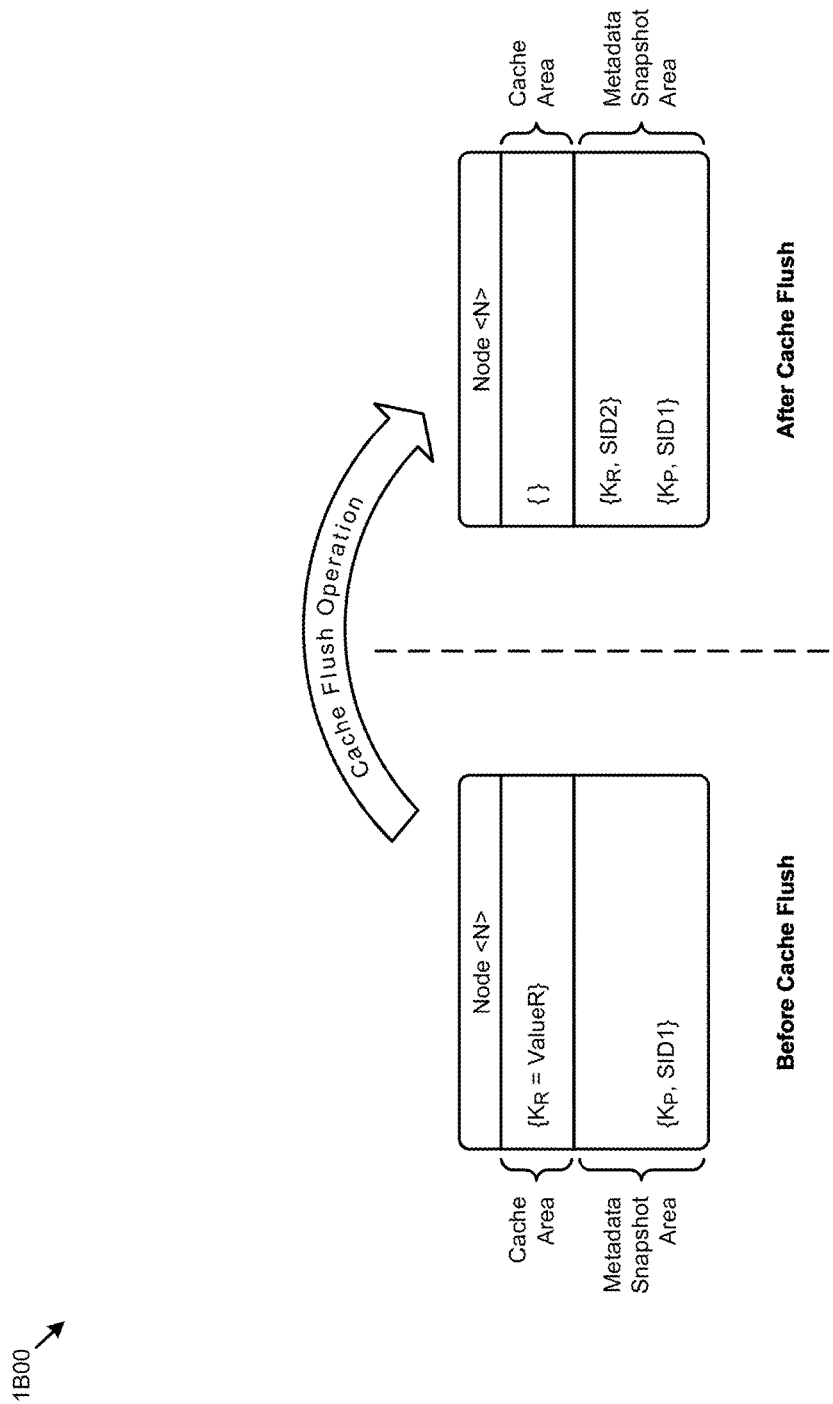
FIG. 1B depicts a cache flush technique as used by nodes in systems that manage incremental snapshots for fast leader node bring-up into a leader mode, according to an embodiment.

FIG. 1B depicts a cache flush technique 1B00 as used by nodes in systems that manage incremental snapshots for fast leader node bring-up into a leader mode. As an option, one or more variations of cache flush technique 1B00 or any aspect thereof may be implemented in the context of the architecture and functionality of the embodiments described herein and/or in any in any environment.

As depicted by the cache flush operation, data in a cache of a particular node (e.g., node <N>) is flushed (e.g., moved) from the cache area into a metadata snapshot area. In the specific example shown, cache contents (e.g., as denoted by contents in braces, as in $\{K_R=\text{Value}_R\}$) is moved into the metadata snapshot area, leaving the cache area empty after the cache flush (e.g., as denoted by no contents in braces, as in { }). Also as depicted, the contents of the metadata snapshot area before cache flush includes an entry that associates a key and a corresponding snapshot ID (e.g., $\{K_P, SID1\}$), whereas after cache flush, the contents of the metadata snapshot area cache includes a further entry (e.g., $\{K_R, SID2\}$) that associates a key and a corresponding snapshot ID pertaining to the data just flushed from cache.

Ongoing operation of the foregoing cache flush technique serves several purposes, in that it (1) provides for high performance for key-value operations on keys that are related to then-current operations by any of the nodes of the computing cluster; (2) provides for periodic saving of keys and respective values to durable, persistent storage in the form of metadata snapshots; and (3) provides for association of a key to a durably-stored snapshot that has the latest value.

The periodic saving of keys and respective values to durable, persistent storage in the form of metadata snapshots means that to bring the replacement leader node up to date with the last saved metadata snapshots (e.g., the last saved metadata snapshots from each of the follower nodes), the replacement leader node can request to receive the most recent snapshot from each of the followers.

Figure 1C:
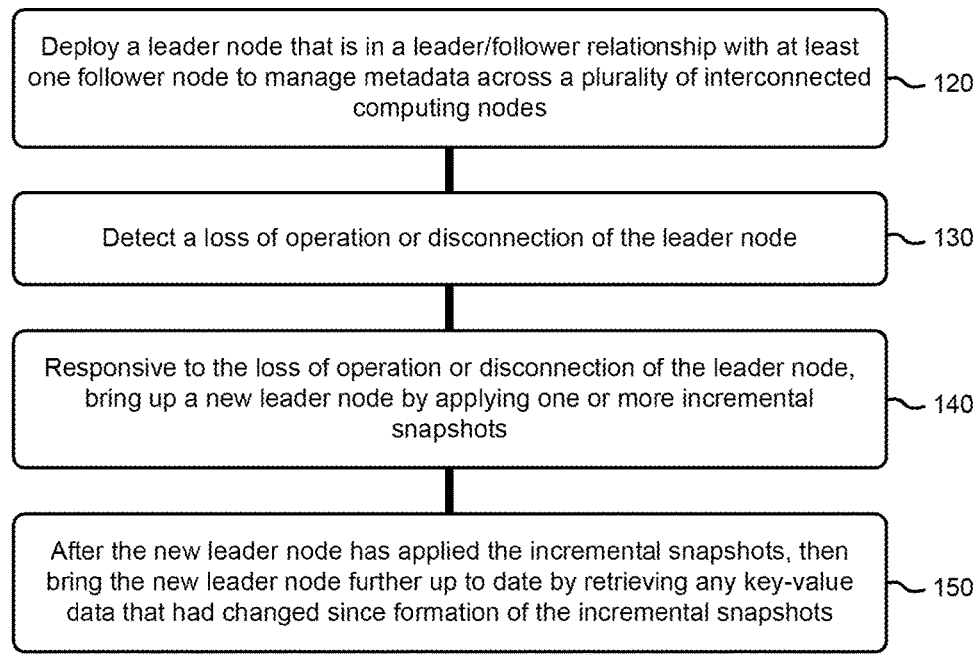
FIG. 1C is a flowchart depicting a bring-up technique as used in systems that manage incremental snapshots for fast leader node bring-up into a leader mode, according to an embodiment.

FIG. 1C is a flowchart depicting a bring-up technique 1C00 as used in systems that manage incremental snapshots for fast leader node bring-up into a leader mode. As an option, one or more variations of bring-up technique 1C00 or any aspect thereof may be implemented in the context of the architecture and functionality of the embodiments described herein and/or in any in any environment.

Any known technique may be employed to identify a computing node that is suitable for deployment as a leader node. Once such a computing node that is suitable for deployment as a leader node has been identified and connected to a network, then signaling can be carried-out to deploy the identified computing node as a leader node in a leader/follower relationship with a follower node of the ring (step 120). The nodes of this ring, whether operating singly or in combination serve to manage metadata across a range of keys. The range of keys may be subdivided into partitions or shards, each of which partition or shard is assigned to a particular node. Any particular node that is assigned to cover a particular partition or shard can be backed by a replica. Such a replica may be configured as a fully-operational node that can be brought into service for covering its corresponding particular partition or shard, or such a replica may be configured as a storage area that can be accessed to retrieve stored data corresponding to a particular partition or shard of keys.

Further, any known techniques including polling and/or health pulse timeouts can be employed to detect a loss of operation or disconnection of the leader node (step 130). For example, in some embodiments a health pulse serves as a heartbeat for the leader node. Logic implemented in the nodes of the ring can be used to detect if the leader node fails or is disconnected or terminated for any reason. In some embodiments, the health pulse may include and/or correspond to information such as whether any nodes have been added or deleted from the ring.

Once a loss of operation or disconnection of the leader node is detected, then responsive to the detected loss of operation or disconnection of the leader node, signaling can be carried out to bring up a new leader node by applying one or more incremental snapshots (step 140).

As previously indicated, it takes a non-zero amount of time between detection of a downed leader node (step 130) and establishment of a new leader node (step 140); as such, it can happen that new keys and/or new values corresponding to previously seen keys are received by follower nodes. To bring the new leader node up to date, the new leader node retrieves any key-value data that had changed since retrieval of the most recent snapshots from the follower nodes (step 150).

Figure 2:
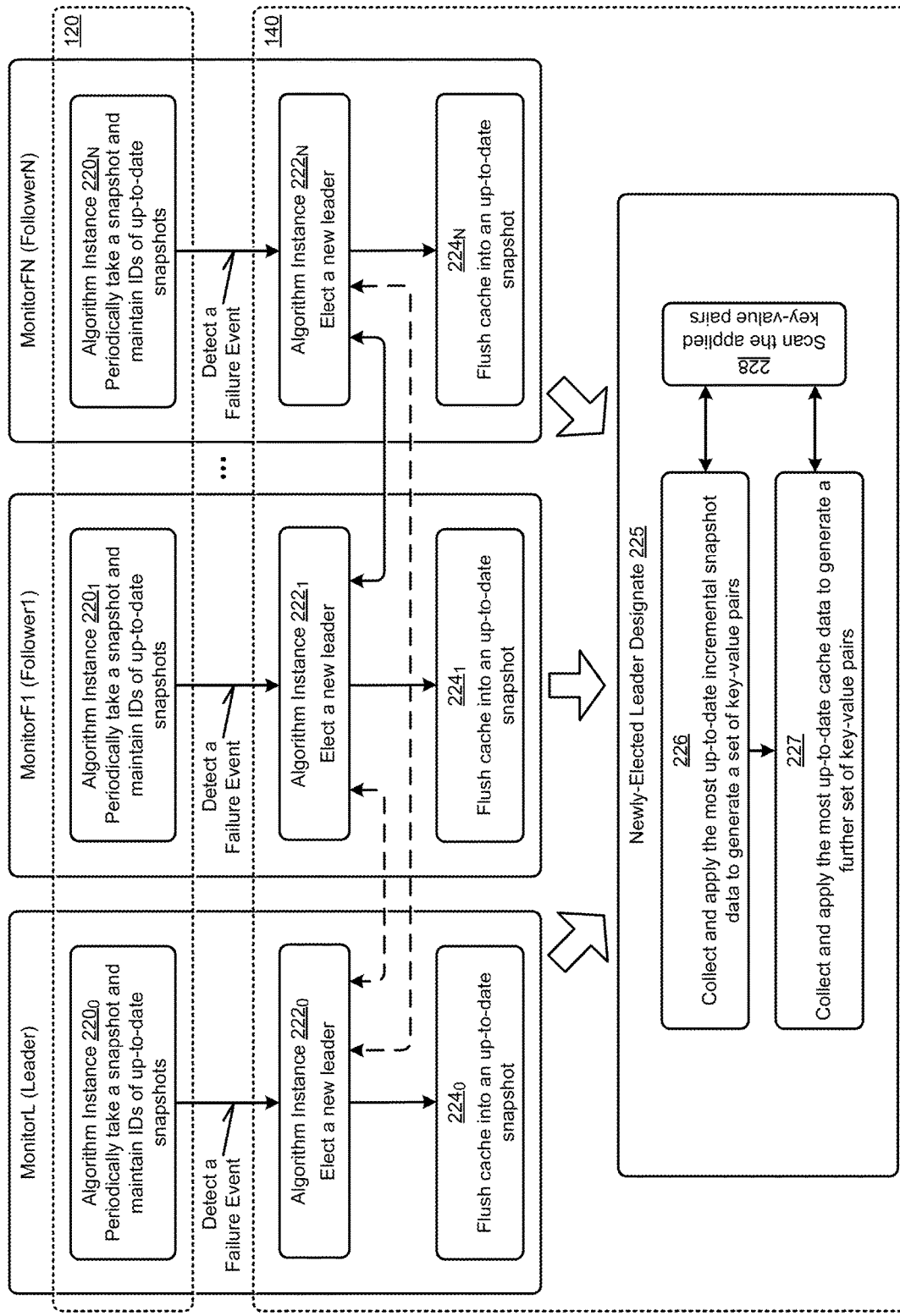
FIG. 2 depicts a replacement leader bring-up technique for fast leader node bring-up into a leader mode using incremental snapshots from followers, according to an embodiment.

FIG. 2 depicts a replacement leader bring-up technique 200 for fast leader node bring-up into a leader mode using incremental snapshots from followers. As an option, one or more variations of replacement leader bring-up technique 200 or any aspect thereof may be implemented in the context of the architecture and functionality of the embodiments described herein and/or in any in any environment.

FIG. 2 is being presented to illustrate how the same logic can be implemented by each node of a ring, whether the node is a designated leader or a designated follower, and how the same logic can be used for both detection of loss of a leader, election of a new leader, and for capturing a then-current metadata snapshot at each of the follower nodes.

As shown, each of a leader node and any number of follower nodes (e.g., follower1 through followerN) carry out steps embodied in steps of respective monitoring code (monitorL, monitorF1, . . . , monitorFN) that are being executed by each of a leader node and any number of follower nodes. The leader and followers are aware of their designation as a leader or follower. The leader and followers operate in a leader/follower relationship (step 120). More particularly, each of the leader and followers each periodically take a snapshot of their own data and maintain their own up-to-date inventory of their own snapshots (algorithm instance $220_0$, algorithm instance $220_1$, algorithm instance $220_N$). Furthermore, each of the followers are independently able to detect a failure event, such as the loss of a leader. In the event of a loss of the leader of the ring, the followers elect a new leader. As shown in this embodiment, the followers elect a new leader by caucusing among themselves to identify a replacement leader. This is shown as algorithm instance $222_1$ and algorithm instance $222_N$. Algorithm instance $222_0$ does not complete since it is at a downed node. That is, as a result of the event that caused the loss of the leader, the leader running code corresponding to algorithm instance $222_0$ cannot caucus with the followers, so only the followers are able to caucus among themselves to identify a replacement leader. This is depicted by dotted lines into and out of algorithm instance $222_0$. On the other hand, the followers can use any known technique to identify and elect a new, replacement leader.

According to some embodiments, a leader node is elected from a group of nodes that are candidates to become a new leader to perform leader-only reads. In some situations, each node in the group of nodes may be assigned an index number, and according to some embodiments, the node with the highest index number is elected to be the leader node. Once a node has been elected as a leader node, all non-leader nodes are informed of the leader node's identity.

Further details regarding general approaches to leadership election are described in U.S. Pat. No. 10,642,507 titled "PULSED LEADER CONSENSUS MANAGEMENT", issued on May 5, 2020, which is hereby incorporated by reference in its entirety.

Continuing the discussion of the embodiment of FIG. 2, once a new leader has been elected by the followers, each of the followers flush their respective cached data to a then up-to-date snapshot (step $224_0$, step $224_1$, . . . , step $224_N$). Further, each of the followers open a new snapshot with a new, higher-numbered index for identification. The higher-numbered index for identification is a monotonically-increasing value that is incremented or otherwise increased for each next snapshot. For example, if a follower 1 had been capturing a snapshot with snapshot ID ("SID")=4, and followerN had been capturing a snapshot with snapshot ID=5, then a request from follower1 for a next snapshot ID would be responded to by snapshot ID 6 (or higher). Any known technique can be used to monotonically increase the index value that is used for each next snapshot. Strictly as one example, an arbiter with a semaphore can be used to keep track of monotonically increasing index values that are used in the designation of a next snapshot ID.

Once a new leader has been elected, the newly-elected leader designate 225 carries out steps to collect and apply the most up to date snapshot data. Specifically, the newly-elected leader designate 225 carries out step 226 to collect and apply the most up-to-date snapshot data, and step 227 to collect and apply the most up-to-date cache data from the followers. Step 228 serves to perform scans over key-value pairs so as to gain consensus from among followers that the leader has correct values for the corresponding keys.

In some cases, the leader collects and receives one or more previously verified snapshots that contain the most up to date snapshotted keys and values (step 226). In such a case, since the particular values of the keys that are in the snapshot have already been verified—at least as of the time the snapshot was taken—then step 228 does not need to be performed over the collected snapshots.

In another case, the leader does not collect and receive incremental snapshot files themselves but rather, the leader sends a key range request to a follower, to which request the follower sends back keys and values corresponding to the particular requested key range.

As heretofore indicated, the leader and followers are aware of their designation as a leader and follower. Moreover the leader node of the ring is aware of every follower node in the ring. As such, node-specific snapshotting operations can be carried out as shown and described as pertains to FIG. 3.

Figure 3:
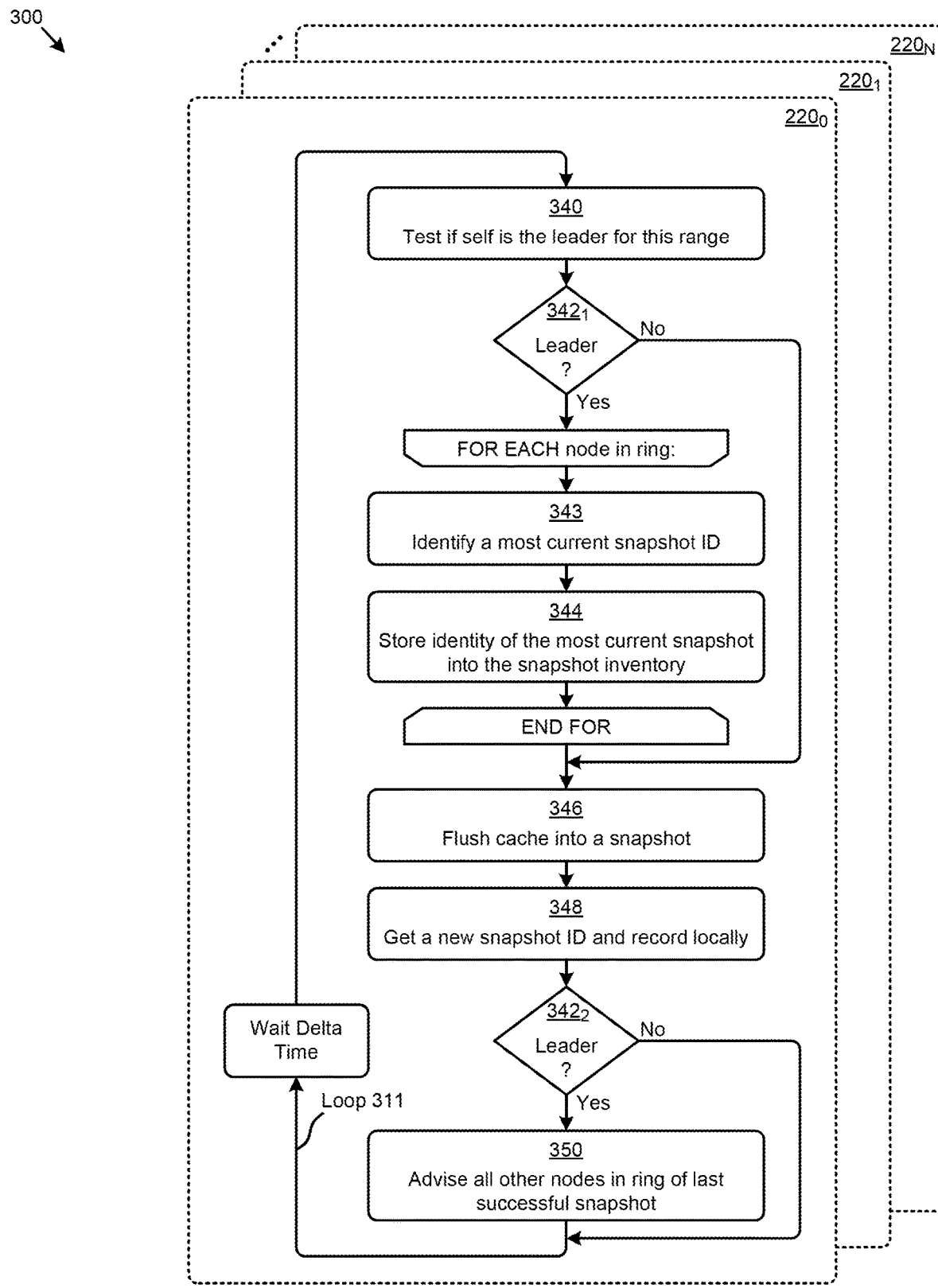
FIG. 3 shows ongoing snapshotting operations as used to manage incremental snapshots in a ring topology, according to an embodiment.

FIG. 3 shows ongoing snapshotting operations 300 as used to manage incremental snapshots in a ring topology. As an option, one or more variations of ongoing snapshotting operations 300 or any aspect thereof may be implemented in the context of the architecture and functionality of the embodiments described herein and/or in any in any environment.

The figure is being presented to illustrate one particular set of ongoing snapshotting operations that can be individually and independently performed using multiple instances of a single algorithm (e.g., algorithm instance $220_0$, algorithm instance $220_1$, . . . , algorithm instance $220_N$). The multiple instances are individually and independently executed by all nodes of a metadata management ring to locally manage node-local cache and snapshot areas.

Specifically, the node-specific, independently operating monitoring operations (e.g., algorithm instance $220_0$, algorithm instance $220_1$, . . . , algorithm instance $220_N$) can operate on their own data as follows: At step 340, a test is performed to determine if the node that is executing that step is a designated leader. If not, the "No" branch of decision $342_1$ is taken. Otherwise, the "Yes" branch of decision $342_1$ is taken. If it's the case that the "Yes" branch of decision $342_1$ is taken, then the leader enters a FOR EACH loop to take a then-current inventory of all current snapshots in the nodes of the ring. Specifically, and as shown, step 343 serves to identify a most current snapshot for a next node, and step 344 serves to store the identity of the most current snapshot into the snapshot inventory. Such a snapshot inventory is stored in a durable location such that even if the leader node goes down, or for any reason becomes disconnected from the network, the snapshot inventory at all nodes of the ring can be known by a replacement leader.

Once the designation (e.g., snapshot ID) of all of the most current snapshots are stored in the aforementioned durable location, then the then-current cache is flushed (step 346) and a new snapshot ID is determined (step 348), possibly from the aforementioned arbiter.

Processing advances to decision $342_2$ whereupon, if the node that is executing this instance of the monitor is the leader, then the "Yes" branch is taken and, at step 350, the leader may optionally advise all other nodes of the ring as to the last successful snapshot as determined by the leader. The acts of step 350 can be performed in addition to the acts of step 344.

The foregoing algorithm is invoked repeatedly in a loop. Specifically, loop 311 includes a wait state. As shown, the wait state is incurred once per loop 311 and as such, the algorithm is invoked repeatedly upon entry into step 340.

Returning to the discussion of FIG. 2, once a new leader has been elected, the newly-elected leader designate 225 carries out steps to collect and apply the most up to date snapshots. One possible technique for doing so is shown and described as pertains to FIG. 4A and FIG. 4B.

Figure 4A:
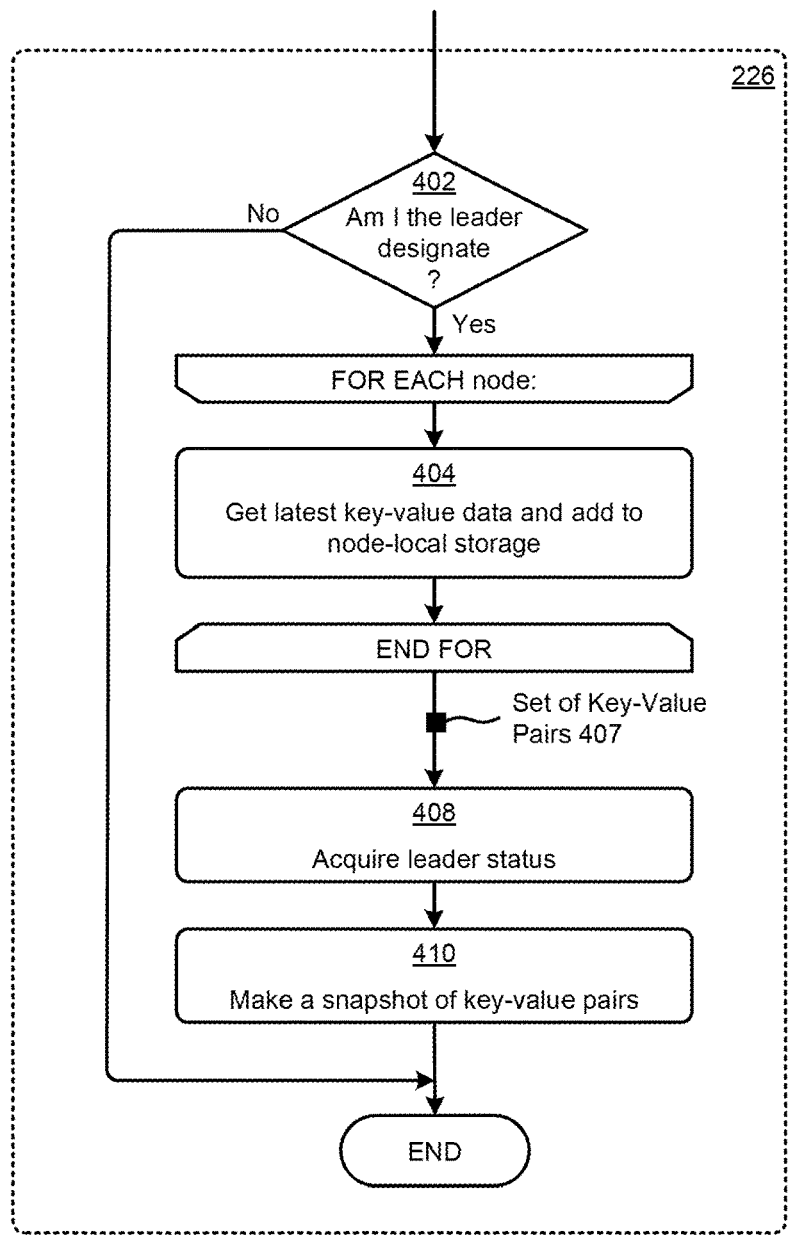
FIG. 4A is a flowchart depicting leader-designate operations as used for fast leader node bring-up into a leader mode, according to an embodiment.

FIG. 4A is a flowchart depicting leader-designate operations 4A00 as used for fast leader node bring-up into a leader mode. As an option, one or more variations of leader-designate operations 4A00 or any aspect thereof may be implemented in the context of the architecture and functionality of the embodiments described herein and/or in any in any environment.

FIG. 4A is being presented to offer one example set of leader-designate operations as used for fast leader node bring-up into a leader mode. In this embodiment, the flow is intended to be performed only by a leader designate in advance of the leader designate actually taking on the role of the leader in the ring. The shown example embodiment is a specific implementation of step 226 of FIG. 2. Specifically, the depicted key-value data retrieval technique 4B00 is executed once the leader designate is operational on the ring. One result of performing the steps of the depicted key-value data retrieval technique 4B00 is that the leader designate enters into an up-to-date data state that has been verified (e.g., by consensus) to be consistent with the follower nodes.

As shown, the key-value data retrieval technique commences at decision 402, which includes a test as to whether or not the node that is about to execute the key-value data retrieval is indeed the leader designate. If not, then the "No" branch of decision 402 is taken and processing ends. Otherwise, the "Yes" branch of decision 402 is taken and a FOR EACH loop is entered. Each iteration of the FOR EACH loop seeks to retrieve the latest key-value data from a particular follower node (step 404). Once the latest key-value data from a particular follower has been successfully retrieved, then the retrieved key-value data is added to a local storage area (e.g., an in-memory cache). Once all iterations through the FOR EACH loop have completed, meaning that the latest key-value data from all followers have been successfully retrieved, then the retrieved key-value data is added to a local set of key-value pairs 407. Furthermore, once all iterations through the FOR EACH loop have completed, meaning that the latest key-value data from all followers has been successfully retrieved, then the leader-designate takes on an actual leadership role (step 408) and a snapshot of the local set of key-value pairs 407 is made (step 410).

Returning to the discussion of step 404, there are various techniques that can be used to retrieve the latest key-value data. One such technique is shown and described as pertains to FIG. 4B.

Figure 4B:
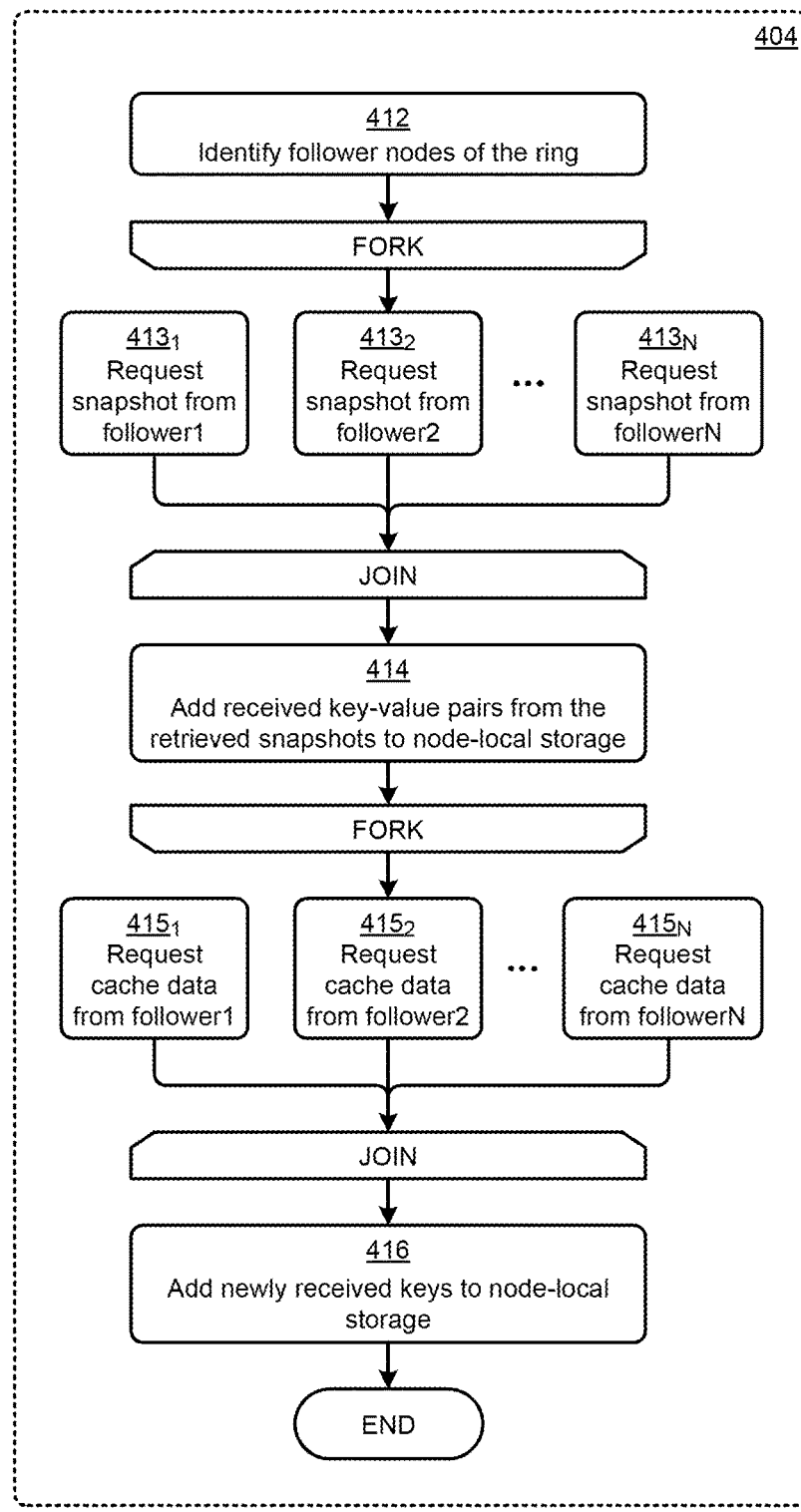
FIG. 4B is a flowchart depicting a key-value data retrieval technique as used for fast leader node bring-up into a leader mode, according to an embodiment.

FIG. 4B is a flowchart depicting a key-value data retrieval technique 4B00 as used for fast leader node bring-up into a leader mode. As an option, one or more variations of key-value data retrieval technique 4B00 or any aspect thereof may be implemented in the context of the architecture and functionality of the embodiments described herein and/or in any in any environment.

The shown flow is one example implementation of step 404 of FIG. 4A. This particular example implementation includes two FORK/JOIN blocks that operate successively. Other FORK/JOIN blocks that operate fully in parallel or partially in parallel and partially successively are reasonable as well. The flow commences at step 412 where the follower nodes of a ring are identified. Then, a first FORK/JOIN block is entered, wherein a request for the latest snapshot from each follower is issued (e.g., request $413_1$, request $413_2$, . . . , request $413_N$). When the requests are satisfied, the FORK/JOIN block is joined and processing continues. Specifically, when the FORK/JOIN block is joined, processing continues to add all of the newly-received key-value pairs to a node-local storage area (step 414).

The second FORK/JOIN block is then entered, wherein a request for further metadata (e.g., cache data) from each follower is issued (e.g., request $415_1$, request $415_2$, . . . , request $415_N$). When the requests for further metadata are satisfied, the FORK/JOIN block is joined and processing continues. When step 416 executes, it adds all of the newly-received key-value pairs to a node-local storage area.

Figure 5:
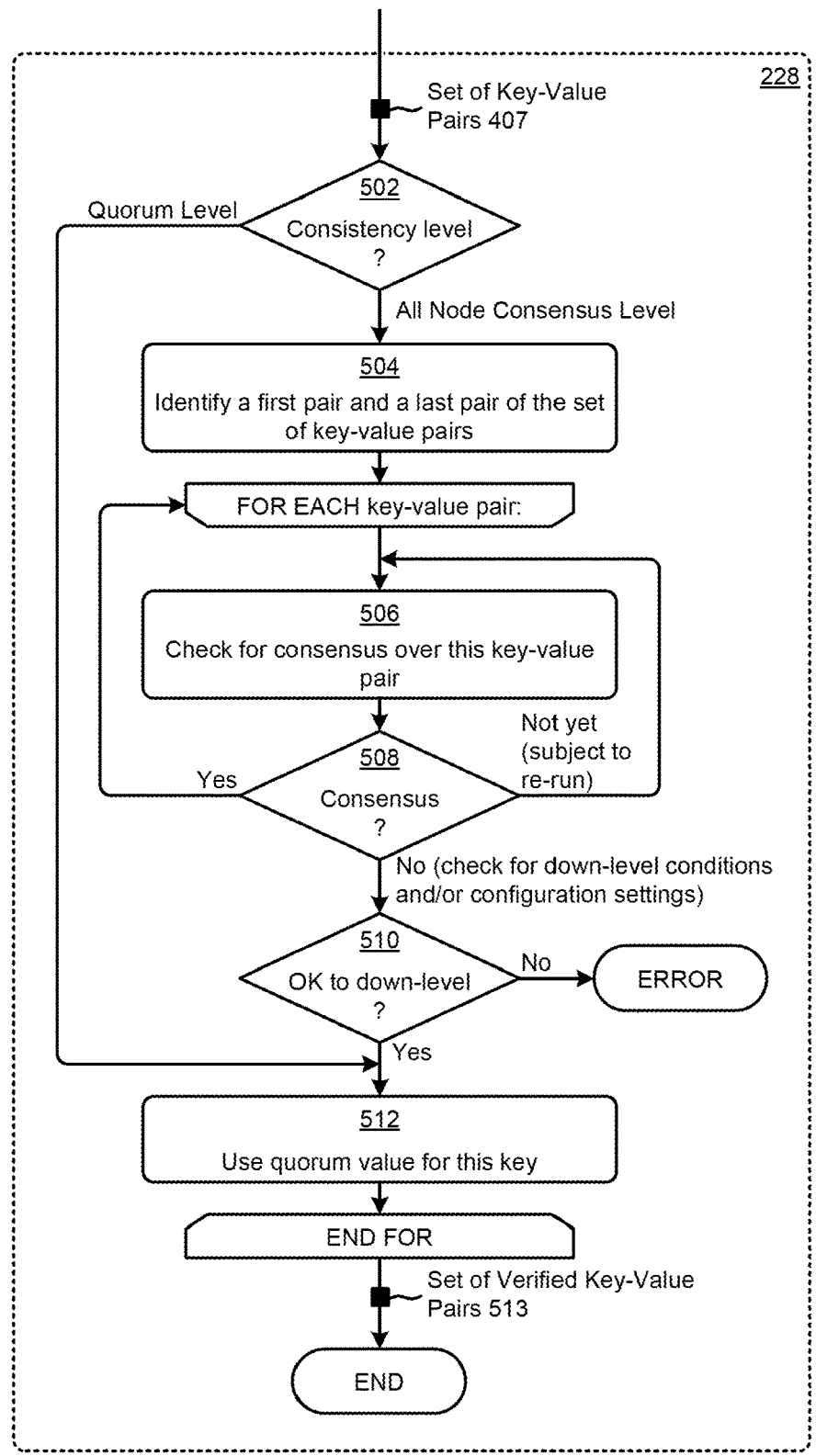
FIG. 5 is a flowchart depicting a key-value scan technique as used for fast leader node bring-up into a leader mode, according to an embodiment.

FIG. 5 is a flowchart depicting a key-value scan technique 500 as used for fast leader node bring-up into a leader mode. As an option, one or more variations of key-value scan technique 500 or any aspect thereof may be implemented in the context of the architecture and functionality of the embodiments described herein and/or in any environment.

The shown flow is one example implementation of step 228 of FIG. 2. This particular implementation supports two different consistency level options for scanning the metadata, however more or fewer consistency level options may be implemented in other embodiments. The specific example implementation of key-value scan technique 500 commences upon receipt of a set of key-value pairs 407. The result of execution of the key-value scan steps is a set of verified and up-to-date set of key-value pairs. The term verified as used herein refers to the fact that some mechanism for multi-node consensus of the value of a particular key has been carried out, and that there is no discrepancy between the involved nodes. Strictly as examples, one option for multi-node consensus involves consensus from as few as a quorum number of the multi-nodes. Another option for multi-node consensus involves checking with all of the multiple nodes to verify 100% consensus over all of the multiple nodes.

These options for consensus level can coexist in one computing cluster. Strictly as pertaining to this one illustrative embodiment, the flow commences at decision 502, which determines whether to comport consistency using all involved nodes or whether to comport consistency using a quorum level. In some cases, and as shown, a first option to comport consistency using all involved nodes can be down-leveled to consistency using a quorum level.

To explain, step 504 identifies a start point (e.g., the first pair) and a last point (e.g., the last pair) of the set of key-value pairs. Then a FOR EACH loop is entered to begin scan processing of the set of key-value pairs. Specifically, step 506 serves to collect values from all nodes for the key being processed in the current iteration. If decision 508 determines that there is consensus from all of the involved nodes, then the "Yes" branch of decision 508 is taken and processing moves on to the next key-value pair. On the other hand, if the key being processed in the current iteration is subject to a rerun of the consensus check, then processing loops back to reenter step 506. However, there are certain situations where the key being processed in the current iteration cannot be verified by all nodes, and where the key being processed in the current iteration is not subject to a rerun of the consensus check, in which case the "No" branch of decision 508 is taken.

For some systems, and/or for some keys, it is reasonable that a check is made (decision 510) to determine if a down-level of the consensus checking is permitted. If not, and error is raised. If "Yes", then a quorum value for this key is used (step 512).

When the operations within the foregoing FOR EACH loop have been carried out over all entries in the set of key-value pairs, and the FOR EACH loop exits, then the set of key-value pairs is deemed to have been verified and the set of verified key-value pairs 513 is used by the leader-only read mode.

Figure 6A:
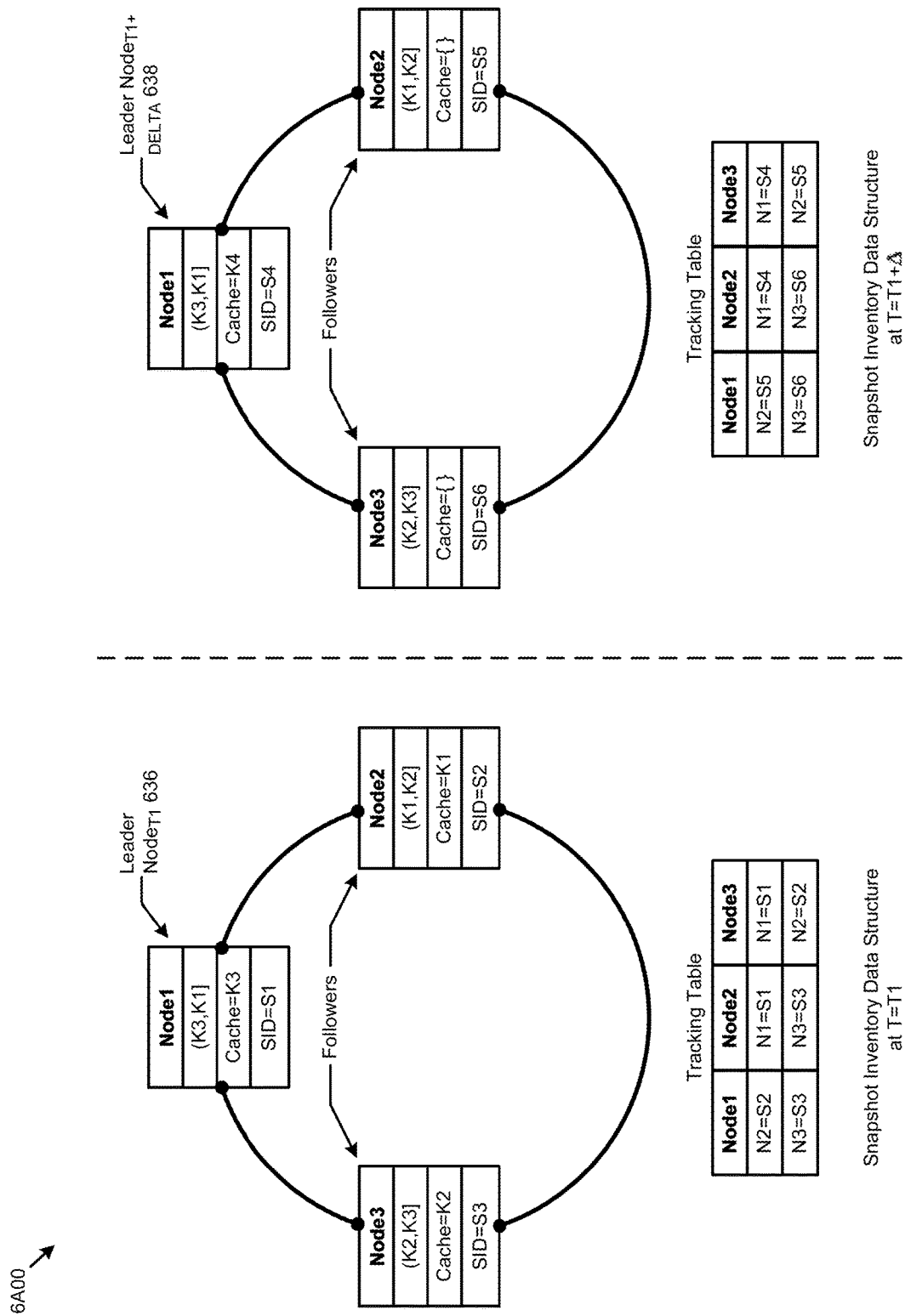
FIG. 6A shows an incremental scan inventory management technique as used in systems that employ incremental snapshots for fast leader node bring-up into a leader mode, according to an embodiment.

FIG. 6A shows an incremental scan inventory management technique 6A00 as used in systems that employ incremental snapshots for fast leader node bring-up into a leader mode. As an option, one or more variations of incremental scan inventory management technique 6A00 or any aspect thereof may be implemented in the context of the architecture and functionality of the embodiments described herein and/or in any in any environment.

On an ongoing basis, a snapshot inventory is kept in durable storage. As shown, node1, node2, and node3 are sharded over respective key ranges, namely (K3,K1] for Node1, (K1,K2] for Node2, and (K2,K3] for Node3. Further, and as shown, node1, node2, and node3 correspond to snapshots S1, S2, and S3, respectively and cache contents of K3 (with a new value), cache contents of K1 (with a new value), and cache contents of K2 (with a new value), respectively. This is the data state at time=T1. The snapshot inventory data structure for time=T1 shows that node1 is tracking that node2 has snapshot S2 and that node3 has snapshot S3. Also, the snapshot inventory data structure for time=T1 shows that node2 is tracking that node1 has snapshot S1 and that node3 has snapshot S3. Still further, the snapshot inventory data structure for time=T1shows that node3 is tracking that node1 has snapshot S1 and that node2 has snapshot S2.

As some moment in time, each node will secure a new snapshot index and flush its cache to a snapshot named by the newly-secured index, after which each node will begin adding newly-seen values into their caches. Strictly as an example, FIG. 6A shows a snapshot inventory as time=T1 plus some small delta time. A comparison between the left side of FIG. 6A and the right side of FIG. 6A reveals that node1 (e.g., leader node$_{T1}$ 636) had flushed its cache into snapshot S4, node2 had flushed its cache into snapshot S5, and node3 had flushed its cache into snapshot S6. Thus, the then current snapshot inventory as of time=T1 plus some small delta time is updated to show that node1 (e.g., leader node$_{T1+DELTA}$ 638) is tracking that node2 has snapshot S5 and that node3 has snapshot S6. Also, the snapshot inventory data structure for time=T1 plus some delta time shows that node2 is tracking that node1 has snapshot S4 and that node3 has snapshot S6. Still further, the snapshot inventory data structure for time=T1 plus some delta time shows that node3 is tracking that node1 has snapshot S4 and that node2 has snapshot S5.

The foregoing snapshot inventory can be used by any node of the ring so as to verify what snapshot is the latest snapshot from any node. An illustrative scenario is shown and described as pertains to FIG. 6B1, FIG. 6B2, 6B3, and FIG. 6B4.

FIG. 6B1, FIG. 6B2, FIG. 6B3, and FIG. 6B4 depict a leader bring-up technique as used in systems that employ incremental snapshots for fast leader node bring-up into a leader mode. As an option, one or more variations of leader bring-up technique or any aspect thereof may be implemented in the context of the architecture and functionality of the embodiments described herein and/or in any in any environment.

FIG. 6B1 shows a data state 6B100 of a three node ring that is undergoing leader bring-up. As shown, node1R covers the key range (K3,K1], and its cache is empty. Its last saved snapshot before failure of the lost leader node 639 is shown as SID=S4. With this data state, node1R accesses the snapshot inventory (operation 1) to discover that the last saved snapshot of node2 is S5 and the last saved snapshot of node3 is S6. Accordingly, node1R needs to retrieve (at least) snapshot S5 and snapshot S6.

FIG. 6B2 shows a scenario 6B200 where node1R (e.g., designated leader node$_{T3}$ 638) requests snapshots from the other nodes of the ring, namely node2 (operation 2) and node3 (operation 4) and retrieves snapshots from the other nodes of the ring, namely from node2 (operation 3) and from node3 (operation 5). These operations occur before node1R assumes the leadership role. This is because node1R will still need to scan key-value pairs to gain consensus. After node1R retrieves snapshots from node2 and node3, node1R updates its local snapshot storage area to record that it has snapshot S4 and a copy of snapshot S5. After node1R retrieves snapshots from node 2 and node3 (operation 3 and operation 5, respectively), node1R updates its local snapshot storage area to record that it has snapshot S4, a copy of snapshot S5, and a copy of snapshot S6.

FIG. 6B3 shows a scenario 6B300 where node1R (e.g., designated leader node$_{T3}$ 638) requests cache data from the other nodes of the ring, namely from node2 and node3 (operation 6 and operation 8, respectively) and then receives cache data from the other nodes of the ring, namely from node2 and node3 (operation 7 and operation 9, respectively). These operations occur before node1R assumes leadership role. This is because node1R will still need to scan key-value pairs to gain consensus. After node1R retrieves cache data from node2, node1R updates its local cache storage area to record that it has cached key-values for key $K_{N1}$. After node1R retrieves cache data from node3 (operation 7 and operation 9), node1R updates its local cache storage area to record that it has cached key-values for key $K_{N1}$ and also for key $K_{N2}$.

FIG. 6B4 shows a scenario 6B400 where, after retrieval of snapshots and cache data from the follower nodes of the ring, the leader-designate node1R perform scans of only the newly incoming keys from cache (operation 10), thus achieving a fast bring-up. Once consensus is achieved over the newly incoming keys, then the leader-designate node1R is able to perform as the ringleader in leader READ-all mode (operation 11). In some scenarios (not shown), the leader is merely a leader of a particular range or one single shard of metadata rather than a leader over all ranges or shards. In such topologies involving replica nodes that handle replicas a particular range or shard, after the leader-designate retrieves range- or shard-specific snapshots and cache data from the replica nodes, the leader-designate node perform scans of only the newly incoming keys from cache, thus achieving a fast bring-up. Once consensus is achieved over the newly incoming keys, then the leader-designate node is able to perform in a leader-only READ mode for the particular range or shard.

Additional Embodiments of the Disclosure

Token Leadership

Since snapshots for a key range are local to the leader, if the leadership of a key range changes permanently (e.g., due to an unrecoverable crash), then it can happen that at least some of the snapshots are no longer valid. In some cases, the most current snapshots that had belonged to a former leader node can be retrieved from a replica.

In some embodiments, responses to requests for cache data might returning more data than the true delta. This can happen, for example, if a previous snapshot gets combined with its subsequent snapshot due to compaction. In such cases, the compaction process may form a snapshot that contains data from an older snapshot. In these cases, a follower node might return more than the expected data, but never returns less than expected.

Consistency Level of the Scans:

In most cases, a leader's key-value scans have to be performed with all node consensus level, however there are circumstances when a quorum level is permitted. Strictly as one example, in the situation when a node in the replica group of the leader does down, then achieving all node consensus is at least temporarily not possible. In such a situation, when the leader is performing tests pertaining to decision 510, the leader will determine that a down-level is permitted, and the leader will down-level to quorum level consistency and perform quorum level consistency operations. In the degenerate case when both consensus cannot be achieved (the "No" branch of decision 508) and also, when the conditions do not permit down-leveling, (the "No" branch of decision 510), then processing moves to an error handling state.

Add Node/Remove Node

In case of an add-node or remove-node event, a key range is either split (i.e., in the add node case) or merged (i.e., in the remove node case). In both cases, the node assignment to the key ranges change. Since the leader keep track of nodes and snapshots, it happens that such events would cause the snapshot inventory to become at least partially invalid. The snapshot inventory can be temporarily marked as invalid until such time as the snapshot inventory is brought up to date so as to show all nodes in the ring accurately, and so as to show the node-by-node snapshot inventory accurately.

Missing Snapshots

It can happen that a snapshot is deemed to be missing. In such cases the snapshot inventory entry is assigned a value of −1 (i.e., to mean invalid or missing snapshot id). When encountering an entry with snapshot id=−1 the leader can be brought up using full scans.

Upgrade Case

In case of upgrades, it can happen that a new node is the first node to enables snapshot based delta scans. In such a case, the snapshot inventory (if any) can be temporarily marked as invalid until such time as the snapshot inventory is brought up to date so as to show all nodes in the ring accurately, and so as to show the node-by-node snapshot inventory accurately. In this case, in event of a leader failure, the leader can be brought up using full scans.

Choices for Functional Partitioning

Some or all or portions of some or all of the foregoing techniques can be implemented in a virtual computing system. In some cases, portions of the foregoing techniques can be implemented in a virtualized controller or other agent of the virtual computing system. Some functional partitioning options are shown and discussed as pertains to FIG. 7A, FIG. 7B, FIG. 7C, and FIG., 7D.

Figure 7A:
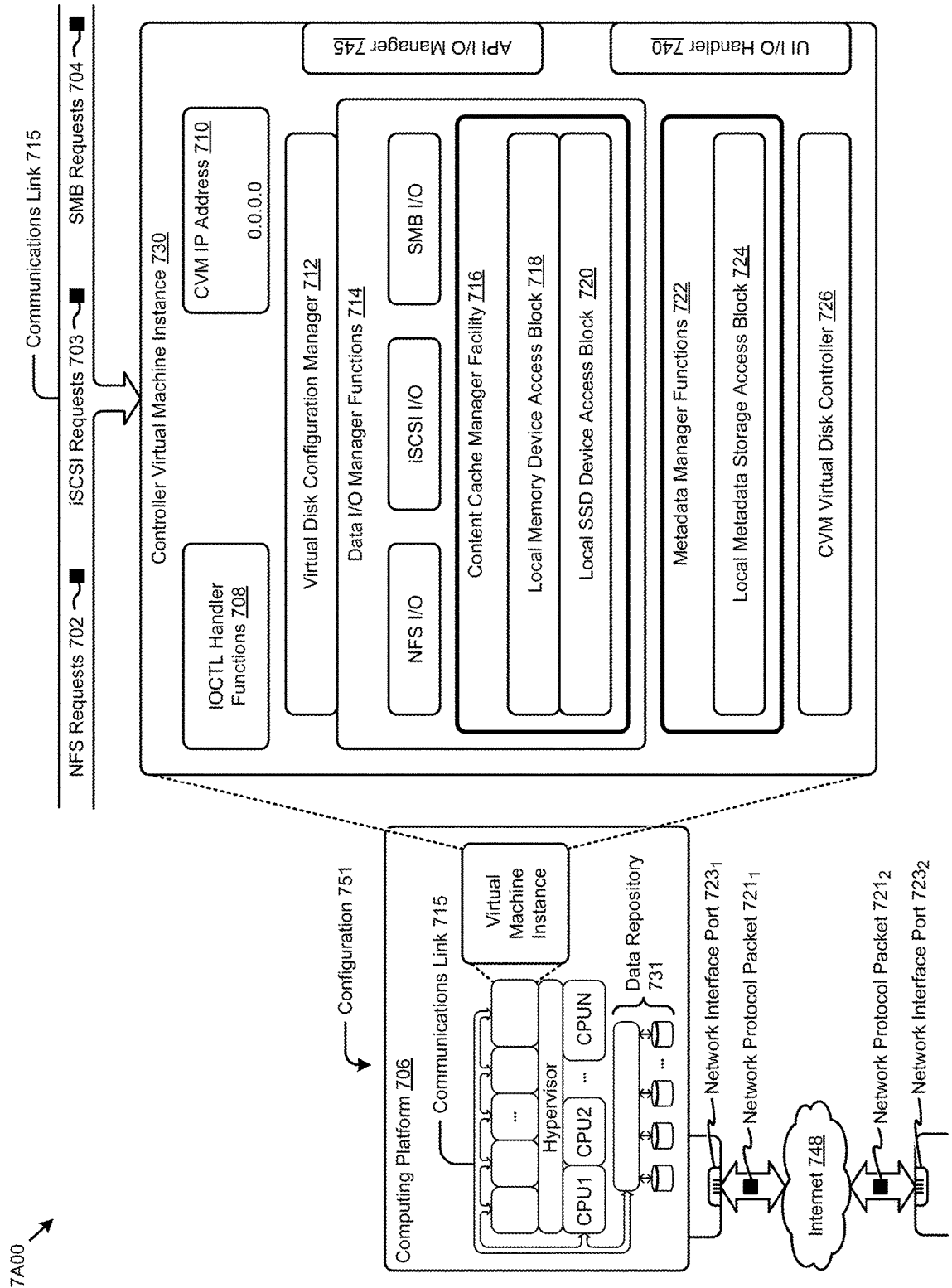
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented in the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to managing incremental snapshots for fast leader node bring-up into a leader mode. In some embodiments, a module may include one or more state machines and/or combinational logic used to implement or facilitate the operational and/or performance characteristics pertaining to managing incremental snapshots for fast leader node bring-up into a leader mode.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing incremental snapshots for fast leader node bring-up into a leader mode). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer managing incremental snapshots for fast leader node bring-up into a leader mode, and/or for improving the way data is manipulated when performing computerized operations pertaining to bringing up a new leader node by applying incremental snapshots.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
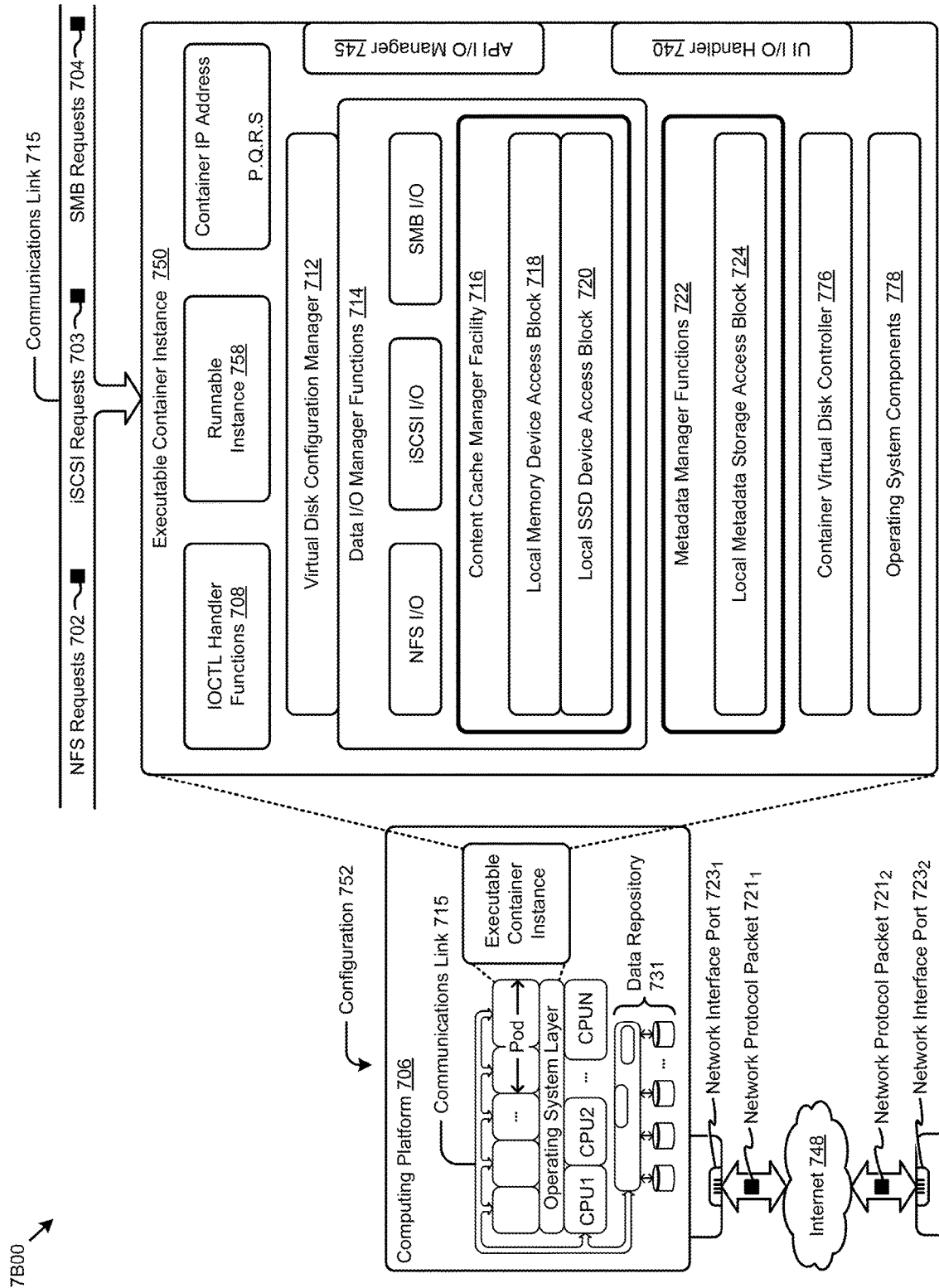

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls—a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
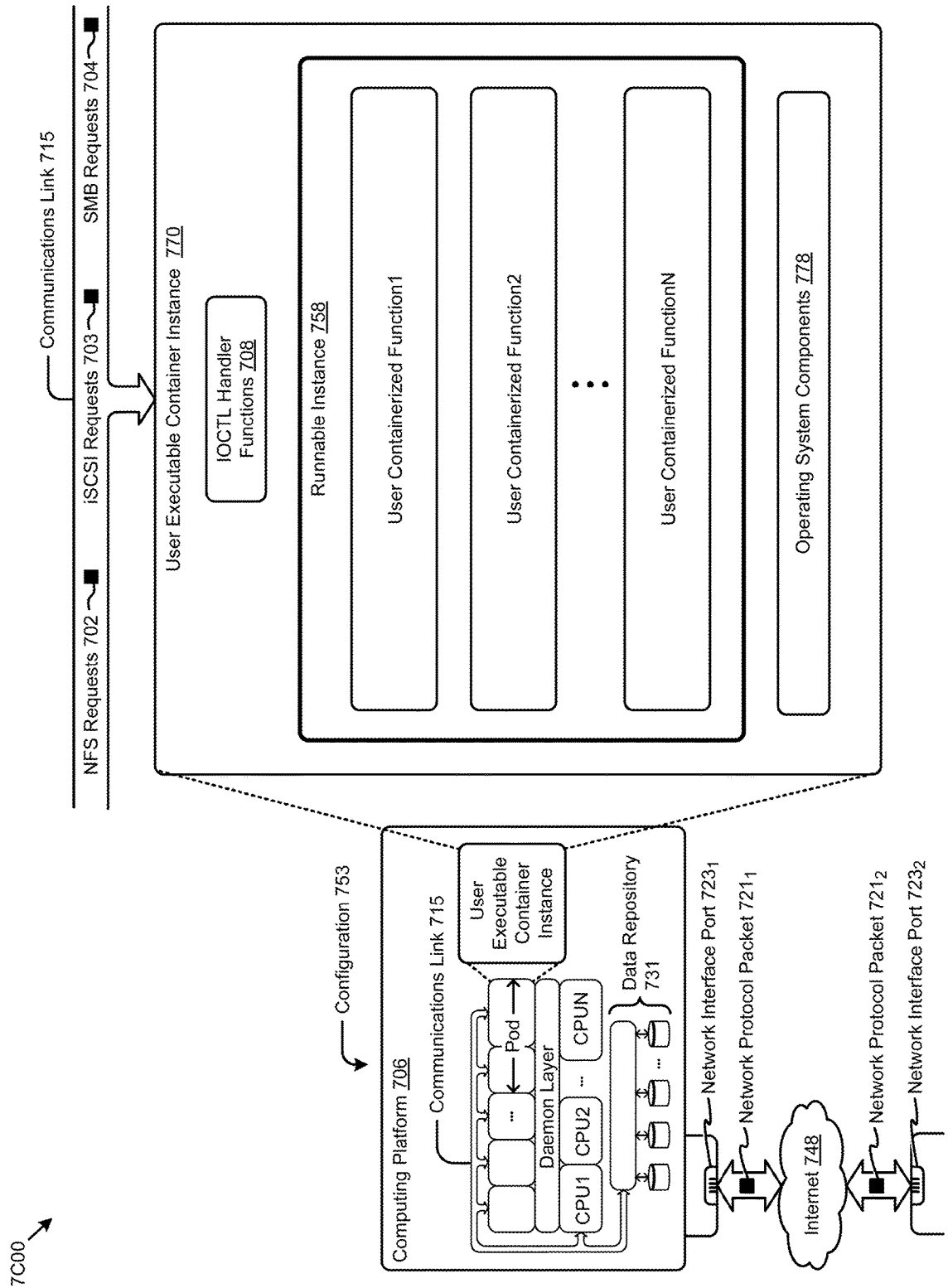

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
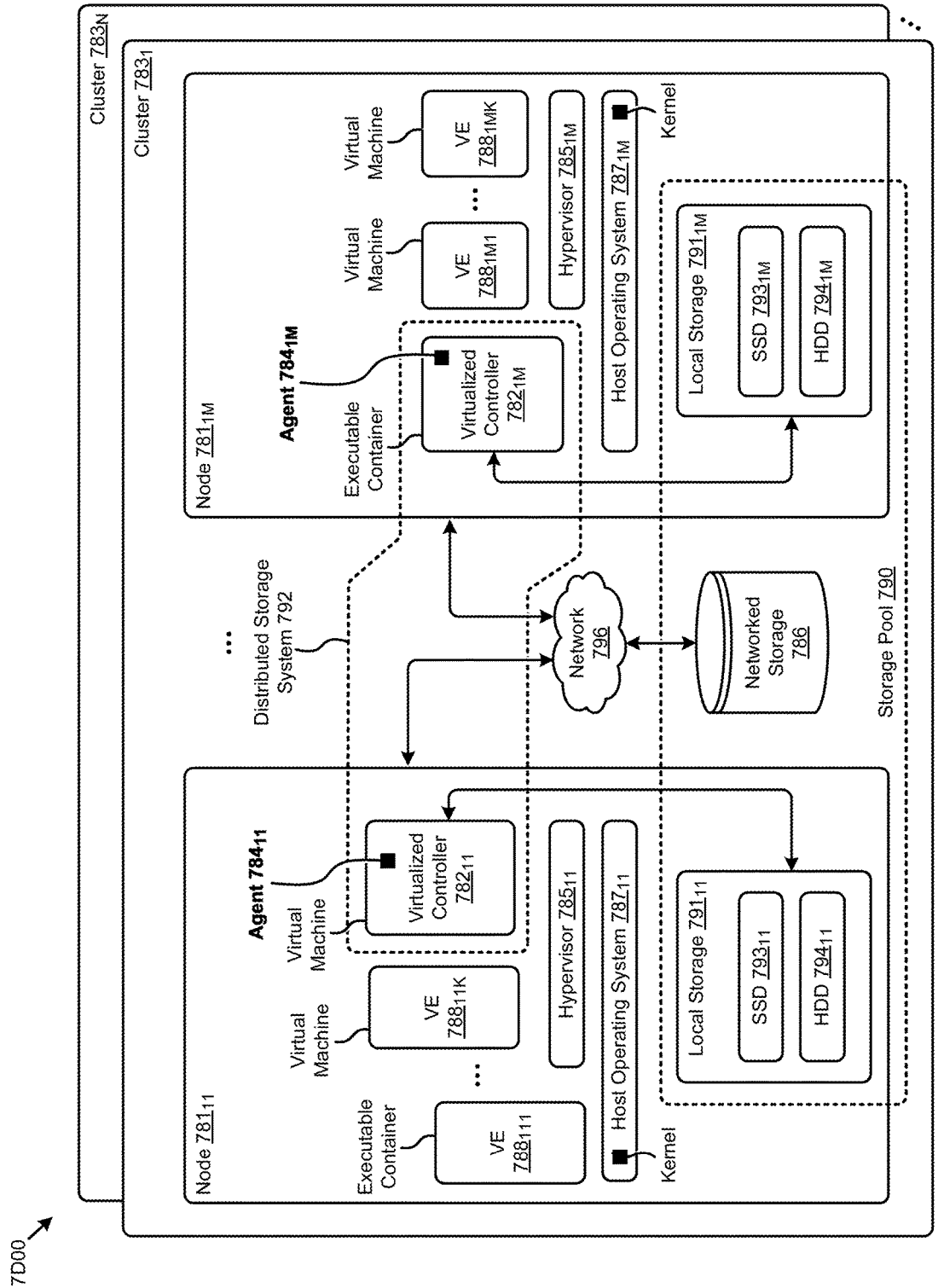

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters (e.g., cluster $783_1$, . . . , cluster $783_N$) comprising multiple nodes that have multiple tiers of storage in a storage pool. Representative nodes (e.g., node $781_{11}$, . . . , node $781_{1M}$) and storage pool 790 associated with cluster $783_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $791_{11}$, . . . , local storage $791_{1M}$). For example, the local storage can be within or directly attached to a server and/or appliance associated with the nodes. Such local storage can include solid state drives (SSD $793_{11}$, . . . , SSD $793_{1M}$), hard disk drives (HDD $794_{11}$, . . . , HDD $794_{1M}$), and/or other storage devices.

As shown, any of the nodes of the distributed virtualization system can implement one or more user virtualized entities (e.g., VE $788_{111}$, . . . , VE $788_{11K}$, . . . , VE $788_{1M1}$, . . . , VE $788_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $787_{11}$, . . . , host operating system $787_{1M}$), while the VMs run multiple applications on various respective guest operating systems. Such flexibility can be facilitated at least in part by a hypervisor (e.g., hypervisor $785_{11}$, hypervisor $785_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $787_{11}$, . . . , host operating system $787_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $781_{11}$ can interface with a controller virtual machine (e.g., virtualized controller $782_{11}$) through hypervisor $785_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $782_{1M}$) in an operating system virtualization environment at a given node. In this case, for example, the virtualized entities at node $781_{1M}$ can access the storage pool 790 by interfacing with a controller container (e.g., virtualized controller $782_{1M}$) through hypervisor $785_{1M}$ and/or the kernel of host operating system $787_{1M}$.

In certain embodiments, one or more instances of an agent can be implemented in the distributed storage system 792 to facilitate the herein disclosed techniques. Specifically, agent $784_{11}$ can be implemented in the virtualized controller $782_{11}$, and agent $784_{1M}$ can be implemented in the virtualized controller $782_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to bringing up a new leader node by applying incremental snapshots can be brought to bear by implementation of one or more of the foregoing embodiments. Moreover, any aspect or aspects of avoiding extensive key-value scan operations when bringing up a new leader node can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause a set of acts comprising:
   bringing up a new leader node in response to a detection of a loss of operation or disconnection of a leader node that was in a leader-follower relationship with a follower node to manage metadata across a plurality of interconnected computing nodes at least by:
      receiving an incremental snapshot at the new leader node, and
      applying the incremental snapshot to the new leader node,
      wherein the incremental snapshot comprises multiple metadata entries changed during a time period corresponding to the incremental snapshot, and first and second metadata entries of the multiple metadata entries were changed at different times; and
   assuming, by the new leader node, a leadership role after applying the incremental snapshot to the new leader node.

2. The non-transitory computer readable medium of claim 1, wherein the set of acts further comprise: retrieving further metadata from the follower node, wherein the further metadata was captured at the follower node after formation of the incremental snapshot.

3. The non-transitory computer readable medium of claim 2, wherein the set of acts further comprise: performing a consensus operation over the further metadata that was retrieved from the follower node.

4. The non-transitory computer readable medium of claim 2, wherein the set of acts further comprise: performing a quorum level consistency operation over the further metadata that was retrieved from the follower node.

5. The non-transitory computer readable medium of claim 1, wherein the leader node is brought to a data state corresponding to a time of the loss of operation or disconnection of the leader node at least by processing the incremental snapshot.

6. The non-transitory computer readable medium of claim 1, wherein the plurality of interconnected computing nodes are assigned to handle distributed metadata for a distributed file system.

7. The non-transitory computer readable medium of claim 6, wherein the distributed metadata for the distributed file system is sharded into a plurality of ranges of metadata.

8. The non-transitory computer readable medium of claim 6, wherein the leader node is assigned to handle one or more shards from among a plurality of ranges of metadata.

9. The non-transitory computer readable medium of claim 1, wherein multiple incremental snapshots are applied to the leader node.

10. The non-transitory computer readable medium of claim 9, wherein a first incremental snapshot of the multiple incremental snapshots applied to the leader node is from a first node and a second incremental snapshot of the multiple incremental snapshots applied to the leader node is from a second node.

11. A method comprising:
   bringing up a new leader node in response to a detection of a loss of operation or disconnection of a leader node that was in a leader-follower relationship with a follower node to manage metadata across a plurality of interconnected computing nodes at least by:
      receiving an incremental snapshot at the new leader node, and
      applying the incremental snapshot to the new leader node,
      wherein the incremental snapshot comprises multiple metadata entries changed during a time period corresponding to the incremental snapshot, and first and second metadata entries of the multiple metadata entries were changed at different times; and
   assuming, by the new leader node, a leadership role after applying the incremental snapshot to the new leader node.

12. The method of claim 11, further comprising retrieving further metadata from the follower node, wherein the further metadata was captured at the follower node after formation of the incremental snapshot.

13. The method of claim 12, further comprising performing a consensus operation over the further metadata that was retrieved from the follower node.

14. The method of claim 12, further comprising performing a quorum level consistency operation over the further metadata that was retrieved from the follower node.

15. The method of claim 11, wherein the leader node is brought to a data state corresponding to a time of the loss of operation or disconnection of the leader node at least by processing the incremental snapshot.

16. The method of claim 11, wherein the plurality of interconnected computing nodes are assigned to handle distributed metadata for a distributed file system.

17. The method of claim 16, wherein the distributed metadata for the distributed file system is sharded into a plurality of ranges of metadata.

18. The method of claim 16, wherein the leader node is assigned to handle one or more shards from among a plurality of ranges of metadata.

19. The method of claim 11, wherein multiple incremental snapshots are applied to the leader node.

20. The method of claim 19, wherein a first incremental snapshot of the multiple incremental snapshots applied to the leader node is from a first node and a second incremental snapshot of the multiple incremental snapshots applied to the leader node is from a second node.

21. A system comprising:
a storage medium having stored thereon a sequence of instructions; and
a processor that executes the sequence of instructions to cause a set of acts comprising,
bringing up a new leader node in response to a detection of a loss of operation or disconnection of a leader node that was in a leader-follower relationship with a follower node to manage metadata across a plurality of interconnected computing nodes at least by:
receiving an incremental snapshot at the new leader node, and
applying the incremental snapshot to the new leader node,
wherein the incremental snapshot comprises multiple metadata entries changed during a time period corresponding to the incremental snapshot, and first and second metadata entries of the multiple metadata entries were changed at different times; and
assuming, by the new leader node, a leadership role after applying the incremental snapshot to the new leader node.

22. The system of claim 21, wherein the set of acts further comprise retrieving further metadata from the follower node, wherein the further metadata was captured at the follower node after formation of the incremental snapshot.

23. The system of claim 22, wherein the set of acts further comprise performing a consensus operation over the further metadata that was retrieved from the follower node.

24. The system of claim 22, wherein the set of acts further comprise performing a quorum level consistency operation over the further metadata that was retrieved from the follower node.

25. The system of claim 21, wherein the leader node is brought to a data state corresponding to a time of the loss of operation or disconnection of the leader node at least by processing the incremental snapshot.

26. The system of claim 21, wherein the plurality of interconnected computing nodes are assigned to handle distributed metadata for a distributed file system.

27. The system of claim 26, wherein the distributed metadata for the distributed file system is sharded into a plurality of ranges of metadata.

28. The system of claim 26, wherein the leader node is assigned to handle one or more shards from among a plurality of ranges of metadata.

29. The system of claim 21, wherein multiple incremental snapshots are applied to the leader node.

30. The system of claim 29, wherein a first incremental snapshot of the multiple incremental snapshots applied to the leader node is from a first node and a second incremental snapshot of the multiple incremental snapshots applied to the leader node is from a second node.

* * * * *